United States Patent
Afzal et al.

(10) Patent No.: US 12,331,960 B1
(45) Date of Patent: Jun. 17, 2025

(54) ABSORBER TUBE FOR PARABOLIC TROUGH SOLAR POWER PLANT

(71) Applicant: Prince Mohammad Bin Fahd University, Dhahran (SA)

(72) Inventors: Abdul Aziz Afzal, Dhahran (SA); Muhammad Azhar Ali Khan, Dhahran (SA); Muhammad Asad, Dhahran (SA); Leen Hassan Al Badah, Dhahran (SA); Ahad Khalid Alghamdi, Dhahran (SA); Lina Ashraf Altahini, Dhahran (SA); Razan Salem Abuzaid, Dhahran (SA); Shams Ameen Almomen, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 18/914,924

(22) Filed: Oct. 14, 2024

(51) Int. Cl.
*F24S 20/20* (2018.01)
*F22B 1/00* (2006.01)
(Continued)

(52) U.S. Cl.
CPC .............. *F24S 20/20* (2018.05); *F22B 1/006* (2013.01); *F24S 10/45* (2018.05); *F24S 23/74* (2018.05);
(Continued)

(58) Field of Classification Search
CPC .............................. F24S 23/74; F24S 2023/834
(Continued)

(56) References Cited

U.S. PATENT DOCUMENTS

| | | | | |
|---|---|---|---|---|
| 3,250,269 A | * | 5/1966 | Sherock .................. | F24S 60/30 |
| | | | | 126/643 |
| 3,815,574 A | * | 6/1974 | Gaydos, Jr. ............. | F24S 70/10 |
| | | | | 126/646 |

(Continued)

FOREIGN PATENT DOCUMENTS

| | | | | |
|---|---|---|---|---|
| CN | 201858919 U | | 6/2011 | |
| WO | WO-2017002127 A1 | * | 1/2017 | .............. F24S 10/45 |
| WO | WO-2021113997 A1 | * | 6/2021 | |

OTHER PUBLICATIONS

Sana Said, et al., "New Evacuated Tube Solar Collector with Parabolic Trough Collector and Helical Coil Heat Exchanger for Usage in Domestic Water Heating", Sustainability 2023, vol. 15, Jul. 25, 2023 (17 Pages).

(Continued)

*Primary Examiner* — Jorge A Pereiro
(74) *Attorney, Agent, or Firm* — Oblon, McClelland, Maier & Neustadt, L.L.P.

(57) ABSTRACT

An absorber tube for a parabolic trough solar power plant is described. The absorber tube includes a glass pipe that extends from a first end to a second end of the parabolic trough. A helical pipe is enclosed within the glass pipe. The helical pipe is configured to hold water. A sand filled pipe is surrounded by the helical pipe. The absorber tube further includes an inner pipe, centered within the sand filled pipe and the inner pipe extends from the first end to the second end of the parabolic trough along a central axis of the glass pipe. A solenoid valve is connected between the helical pipe and the inner pipe. The solenoid valve is configured to block the water from entering the inner pipe during periods of high solar irradiance and release the water to the inner pipe during periods of low solar irradiance.

13 Claims, 14 Drawing Sheets

(51) Int. Cl.
*F24S 10/40* (2018.01)
*F24S 23/74* (2018.01)
*F24S 50/40* (2018.01)
*F24S 60/00* (2018.01)
*F24S 80/50* (2018.01)

(52) U.S. Cl.
CPC .............. *F24S 50/40* (2018.05); *F24S 60/00* (2018.05); *F24S 80/50* (2018.05)

(58) Field of Classification Search
USPC ................................ 126/692, 617, 618, 620
See application file for complete search history.

(56) References Cited

U.S. PATENT DOCUMENTS

| | | | | | |
|---|---|---|---|---|---|
| 4,121,566 | A | * | 10/1978 | Radenkovic | F24F 5/0046 126/400 |
| 4,153,955 | A | * | 5/1979 | Hinterberger | F24S 20/02 126/609 |
| 4,215,674 | A | * | 8/1980 | Riggs | F24S 23/80 126/657 |
| 4,248,209 | A | * | 2/1981 | Wasserman | F24S 60/00 165/157 |
| 4,324,230 | A | * | 4/1982 | Lunsford | F24S 40/90 126/584 |
| 4,326,502 | A | * | 4/1982 | Radenkovic | F24S 10/75 126/685 |
| 4,327,705 | A | * | 5/1982 | Steutermann | F24S 20/67 126/623 |
| 4,328,792 | A | * | 5/1982 | Shores | F24S 23/74 126/696 |
| 4,373,515 | A | * | 2/1983 | Morgan | F24S 20/20 126/677 |
| 4,469,088 | A | * | 9/1984 | Anzai | F24S 20/20 165/47 |
| 6,637,427 | B1 | | 10/2003 | Yeomans | |
| 8,851,066 | B1 | * | 10/2014 | Kapteyn | F24S 60/00 126/643 |
| 11,788,772 | B2 | | 10/2023 | Mohamad et al. | |
| 2005/0109387 | A1 | * | 5/2005 | Marshall | H02S 10/30 136/253 |
| 2011/0043044 | A1 | * | 2/2011 | Chu | H02S 10/12 307/80 |
| 2012/0174910 | A1 | * | 7/2012 | Gil | F24S 23/74 126/634 |
| 2018/0142905 | A1 | * | 5/2018 | Plourde | F24S 50/40 |
| 2023/0358414 | A1 | * | 11/2023 | Guerrero | F24D 11/007 |

OTHER PUBLICATIONS

U.S. Appl. No. 19/185,508, filed Apr. 22, 2025, Afzal, et al.
U.S. Appl. No. 19/185,573, filed Apr. 22, 2025, Afzal, et al.
U.S. Appl. No. 19/185,532, filed Apr. 22, 2025, Afzal, et al.
U.S. Appl. No. 18/914,924, filed Oct. 14, 2024, Afzal, et al.

* cited by examiner

ABSORBER TUBE FOR PARABOLIC TROUGH SOLAR POWER PLANT

BACKGROUND

Technical Field

The present disclosure is directed towards steam generation from solar energy, and more particularly, directed towards an absorber tube for a parabolic trough solar power plant which generates steam.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Presently, the energy crisis is a widely discussed topic in the field of energy. In general, the energy crisis may be defined as the shortage of supply of energy when demand faces a sudden increase. Currently, energy requirements are primarily met by fossil fuels such as, but not limited to, coal, oil, and gas. However, the supply of fossil fuels is limited, and there is also a risk of the negative impacts, caused by burning of the fossil fuels and subsequent emissions, on global climate. Above described situation has changed little over time, resulting in a falling supply. Though advances in technology have located newer oil and gas fields, they are not sufficient to meet increasing demands. At the same time, unconventional sources such as tar sands and shale gas are undergoing research to find a solution to the energy crisis. Economically, fossil fuels experience price volatility due to global market dynamics and geopolitical factors, leading to uncertain long-term costs. However, efficient and environmentally friendly alternative to fossil fuels are needed in order to mitigate global warming and meet the energy demands of the world.

Solar energy has been considered one such alternative for decades, since solar energy is widely available and solar energy is a renewable resource. Conversely to fossil fuels, solar energy systems require initial investment but offer stable energy costs once installed, as sunlight is freely available. Scalability potential of solar energy establishments is also notable. A plurality of methods for harnessing solar energy are currently being employed in various sectors, however, there still is a requirement for a better system and apparatus to harness solar energy and use it in an advantageous manner. Solar heat collectors are used to absorb heat from sunlight. In particular, a parabolic trough is a solar heat collector that uses mirrors, arranged in a curve, which is extended in a straight line to focus the sun rays on a focal line. Elements to be heated, commonly known as absorber tubes, are positioned on the focal line. The absorber tubes generally contain water, which when heated by the focused sunlight, is converted to steam which in turn is used to perform external work such as driving a turbine. One of the main advantages of parabolic trough solar collectors is scalability. Solar parabolic trough collectors may be used to generate electricity on a small scale, such as for a home or a business, and on a large scale, such as for a power plant. Parabolic trough solar collectors are generally reliable and have a long lifespan. Solar parabolic trough collectors are not as susceptible to weather damage as other types of solar collectors, such as photovoltaic panels. Factors such as weather conditions and different times of the day change the intensity of the irradiation, thereby affecting the heat received by the absorber tubes. A plurality of improvements have been made to the structures of the absorber tubes to enhance the heating effect and optimize the utilization of the absorbed heat. However, as per modem standards and requirements, there is still a room for improvement in this technology.

U.S. Pat. No. 6,637,427B1 describes an absorber tube having an inner and outer tube, which extends along a focus length of a parabolic reflecting trough. The absorber tube includes an annular portion through which a working fluid flows. The annular portion consists of a helical flow passage extending along the tube assembly. However, the reference does not mention a helical pipe, or a sand filled pipe.

CN201858919U describes an absorption tube of a heat storage device connected to a parabolic trough heat transfer input pipe which penetrates through a closed heat storage space in which a heat transfer medium is arranged in a heat transfer input pipe. Further, a heat exchange output device includes a heat exchange output tube and a heat exchange medium in the heat exchange output tube. The heat exchange output pipe includes fins that penetrate into the closed heat storage space and exchanges heat with a heat storage medium such as magnesia, foam cement, ceramic, sand, heat transfer oil and metal plates. The parabolic trough heats the pipe during the day and the heat transfer medium stores the heat. At night, the heated water is released. However, this reference does not mention a two pipe system with a valve which operates in two modes to inject water into an outer pipe during the day and into a pipe embedded in the sand during the night.

U.S. Ser. No. 11/788,772B2 describes a receiver unit for a parabolic trough solar plant. The receiver unit includes an absorber pipe that may be filled with a sand. Further, the absorber pipe, a glass cover, and a heat transfer fluid 14 are discretized into control volumes. However, the reference does not mention that the sand filled pipe is surrounded by a helical pipe.

Each of the aforementioned publications suffers from one or more drawbacks hindering their adoption, such as inconsistent heating of water due to fluctuations in irradiation and low efficiency. Accordingly, it is one object of the present disclosure to provide a system and a method for steam generation using a solar parabolic trough collector and a two pipe heat exchanger which produces steam during periods of high irradiance and releases steam during periods of low irradiance.

SUMMARY

In an exemplary embodiment, an absorber tube for a parabolic trough solar power plant is described. The absorber tube includes a glass pipe that extends from a first end to a second end of a parabolic trough. A helical pipe is enclosed within the glass pipe and the helical pipe extends from the first end to the second end of the parabolic trough along a central axis of the glass pipe. The helical pipe is configured to hold water. A sand filled pipe is surrounded by the helical pipe and the sand filled pipe extends from the first end to the second end of the parabolic trough along the central axis of the glass pipe. The absorber tube further includes an inner pipe centered within the sand filled pipe and the inner pipe extends from the first end to the second end of the parabolic trough along the central axis of the glass pipe. A solenoid valve is connected between the helical pipe and the inner pipe. The solenoid valve is configured to block the water from entering the inner pipe when the solenoid valve is closed and release the water to the inner pipe when the solenoid valve is opened.

In another exemplary embodiment, a method for generating steam in an absorber tube of a parabolic trough solar power plant is described. The method includes receiving water into a helical pipe located within a glass pipe encasing the absorber tube. The glass pipe and the helical pipe extend from a first end to a second end of a parabolic trough along a central axis of the glass pipe and a central axis of the helical pipe is concentric with the central axis of the glass pipe. Further, during periods of high irradiance, the method includes converting the water in the helical pipe to steam by focusing solar radiation upon the absorber tube and heating sand in a sand filled pipe surrounded by the helical pipe. The sand filled pipe extends from the first end to the second end of the parabolic trough along the central axis of the glass pipe. The method further includes expelling the steam from the helical pipe into a steam holding tank. Further, during periods of low irradiance, the method includes releasing, by a solenoid valve connected between the helical pipe and an inner pipe, water within the helical pipe to the inner pipe located within the sand filled pipe and converting the water in the inner pipe to steam by heat exchange with the heated sand in the sand filled pipe. The method further includes expelling the steam from the inner pipe into the steam holding tank.

In yet another exemplary embodiment, a method for assembling an absorber tube is described. The method includes inserting an inner pipe into an outer pipe, filling the outer pipe with sand, surrounding the outer pipe with a helical pipe, encasing the helical pipe with a glass pipe, and connecting the inner pipe to a solenoid valve.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
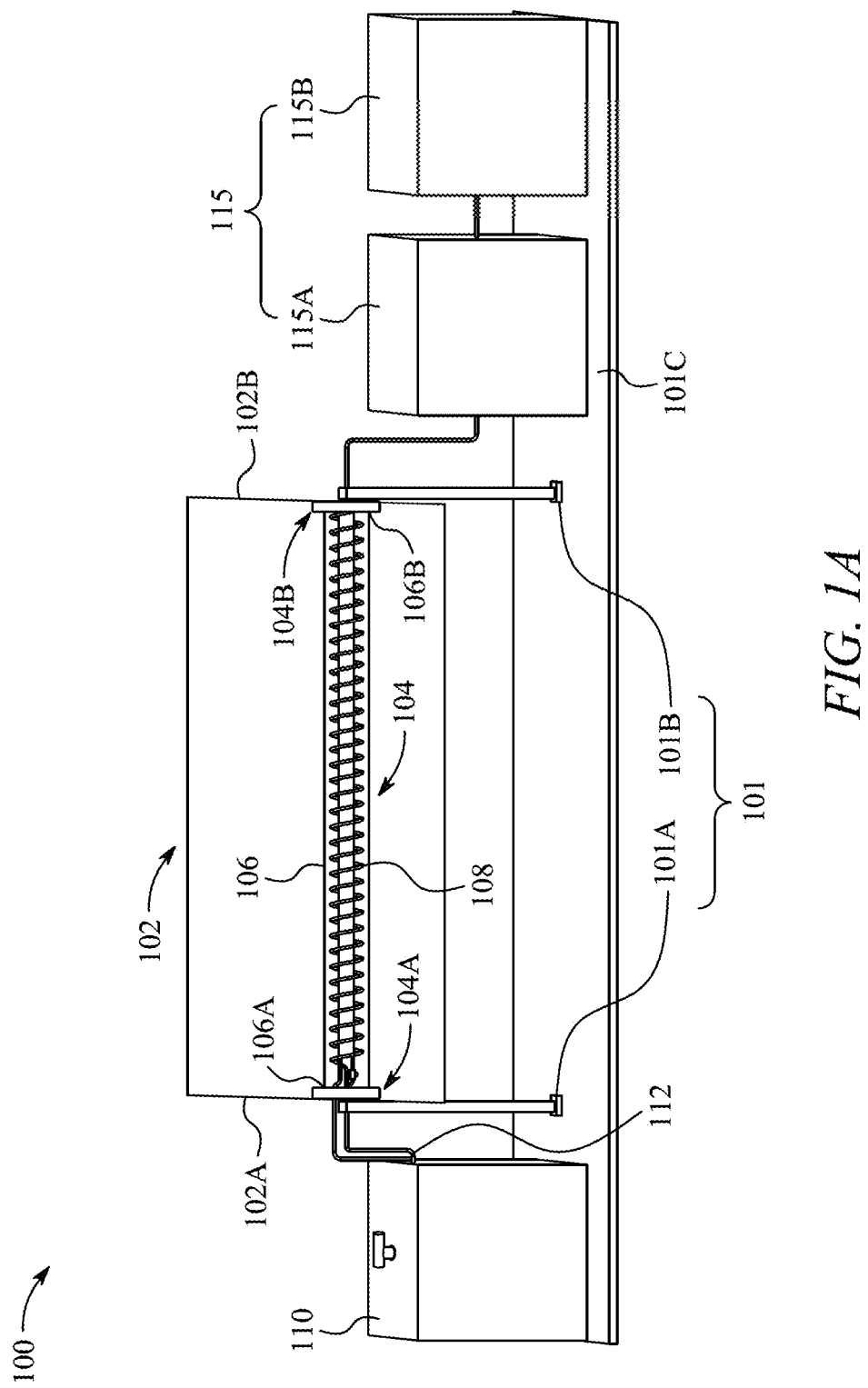
FIG. 1A is a schematic diagram of a solar parabolic trough power plant, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of the present disclosure are directed to an absorber tube of a parabolic trough solar power plant and a method for steam generation using the parabolic trough solar power plant. The present disclosure further includes a method for assembling the absorber tube for the parabolic trough solar power plant. The absorber tube includes a helical pipe for circulation of water and steam generation, and an inner pipe for production of super-heated steam through heat exchange with a sand filler storing heat. The super-heated steam may be used for a plurality of applications in different industries such as power generation. A design of the absorber tube, according to the present disclosure, permits the absorber tube to be retrofitted to existing parabolic trough power plants.

Referring to FIG. 1A, a schematic diagram depicting a plurality of components included in a parabolic trough solar power plant 100 is illustrated. The parabolic trough solar power plant 100, as described in FIG. 1, may be alternatively referred to as "the power plant 100" hereinafter, for brevity in application. The power plant 100 includes a parabolic trough 102 having a first end 102A and a second end 102B. In some aspects, the parabolic trough 102 is secured on a pair of stands 101, including a first leg 101A and a second leg 101B. The pair of stands 101 ensures secure placement of the parabolic trough 102 at a site of employment of the power plant 100. A height and corresponding constructional dimensions of the first leg 101A and the second leg 101B may be adjusted as per a requirement of the site of employment of the power plant 100. The pair of stands 101 is configured to be corrosion resistant, in order to provide longevity to the power plant 100. The pair of stands 101 may be manufactured using galvanized steel, stainless steel, or any other suitable corrosion resistant metal. In some aspects, the power plant 100 is configured to be set up on an elevated surface 101C. In some aspects, the elevated surface 101C provides protection from environmental factors to the power plant 100. The elevated surface 101C may prevent rust and corrosion formation on surfaces of a plurality of components included in the power plant 100. A height and associated constructional dimensions of the elevated surface 101C may be determined based on a requirement of the site of employment of the power plant 100.

The power plant 100 further includes an absorber tube 104. The absorber tube 104 is configured to have a first end 104A and a second end 104B, corresponding to the first end 102A and the second end 102B of the parabolic trough 102, respectively. In general, the parabolic trough includes a straight shape in one dimension and curved contours in the other two dimensions. The parabolic trough is designed to concentrate rays of the sun to enter parallel to an axis of symmetry of the parabolic trough and subsequently concentrate the rays along a focal line. A receiver is an absorber tube situated right above a center of the parabolic trough. The reflecting surfaces of the parabolic trough are made of any of a reflective silver-painted metal, a polished aluminum and mirrors.

The absorber tube 104 includes a glass pipe 106 which extends from the first end 102A to the second end 102B of the parabolic trough 102. The glass pipe 106 is configured to encase a plurality of components included in the absorber tube 104. A glass used for the glass pipe 106 may include, but is not limited to, float glass, tempered glass, and laminated glass. In some aspects, a first end 106A of the glass pipe 106 is detachably coupled with the first end 102A of the parabolic trough 102 and a second end 106B of the glass pipe 106 is detachably coupled with the second end 102B of the parabolic trough 102. Further, the absorber tube 104 includes a helical pipe 108 enclosed within the glass pipe 106, as such, the helical pipe 108 extends from the first end 102A to the second end 102B of the parabolic trough 102 along a central axis 'A' of the glass pipe 106. In particular, the helical pipe 108 extends along a length of the glass pipe 106. In one aspect, the helical pipe 108 is configured to hold water. However, in another aspect, the helical pipe 108 may hold another thermal fluid such as thermal oil or a mixture of water and thermal oil. In some aspects, the helical pipe 108 may be manufactured using aluminium, copper, brass, an alloy, or a combination thereof.

The power plant 100 further includes a water supply tank 110 configured to fluidly couple with a water inlet pipe 112. A water fill plug 110A is disposed at a top end of the water supply tank 110. The water fill plug 110A provides access to fill the water supply tank 110 with a required quantity of water as determined by a water level sensor (not shown) in the water supply tank 110. The water level sensor may generate a reminder when the water reaches critically low levels. A material used for manufacturing the water supply tank 110 may include, but is not limited to, thermoplastic, metal, an alloy, and insulated polycarbonate. In one aspect, the water supply tank 110 is located at a same level as the absorber tube 104, as such, water in the water supply tank 110 is transferred to the water inlet pipe 112 by a pump. In another aspect, the water supply tank is supported above the parabolic trough 102 to use a gravity feed to supply water to the water inlet pipe 112. Further, the water inlet pipe 112 is connected to the helical pipe 108 at the first end 102A of the parabolic trough 102, as such, the water inlet pipe 112 is configured to receive water from the water supply tank 110. Furthermore, the power plant 100 includes a steam holding tank 115, where the steam holding tank 115 further includes a first steam holding tank 115A and a second steam holding tank 115B.

Figure 1B:
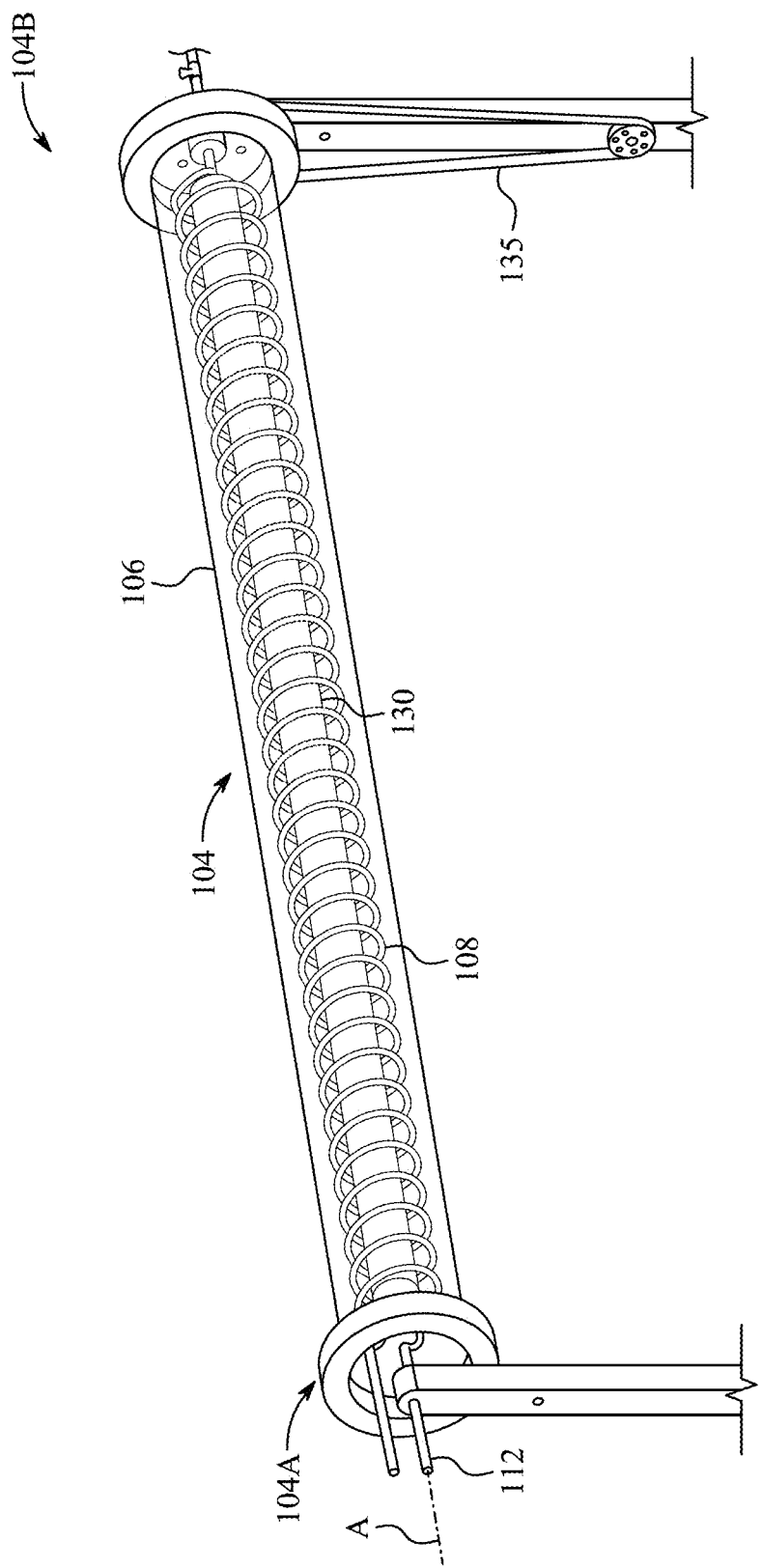
FIG. 1B is a schematic perspective view of an absorber tube included in the solar parabolic trough power plant of FIG. 1A, according to certain embodiments.

Referring to FIG. 1B, a schematic perspective view of the absorber tube 104 is illustrated, according to certain aspects. The perspective view of the absorber tube 104 depicts the helical pipe 108 extending from the first end 102A of the parabolic trough 102 to the second end 102B of the parabolic trough 102. Further, as can be seen from FIG. 1B, the absorber tube 104 includes an outer pipe 130 filled with sand 132. The outer pipe 130 is alternatively referred to as "the sand filled pipe 130". The sand filled pipe 130 is surrounded by the helical pipe 108, as such, the sand filled pipe 130 extends from the first end 102A to the second end 102B of the parabolic trough 102 along the central axis 'A' of the glass pipe 106. In a non-limiting example, the helical tube is about 9.5 mm in diameter while the number of spirals per unit length is about 8.5 spirals/m. The diameter of the sand filled pipe is about 76.2 mm. The length of all the components are the same, that is, about 2450 mm, while the inner pipe has four passes within the sand filled pipe. The sand particle size range from about 1.5 mm to about 2 mm. The sand composition is quartz and the morphology is rounded particles with very few angular edges.

In one aspect, the parabolic trough 102 of the power plant 100 may be configured to mechanically couple with a chain drive 135, which is configured to rotate the parabolic trough 102 about the central axis 'A' in order to provide even sunlight exposure to the absorber tube 104. The chain drive 135 rotates the parabolic trough 102 in such a way that the parabolic trough 102 is always positioned to face optimal sunlight. This may be achieved by communicating with a motor, used to operate the chain drive 135, to a controller as described later, with reference to FIG. 2. The controller may further receive a signal to actuate the motor by a light sensor. The motor used may be a stepper motor, digitally actuated to guide the parabolic trough 102, as such, the reflective surfaces of the parabolic trough 102 are incident with optimal sunlight intensity at all times, during periods of high irradiance. In some aspects, the chain drive 135 is configured to include mechanical stoppers, to prevent the parabolic trough 102 from rotating in a 360 degree pattern.

In another aspect, the chain drive 135 may be configured to rotatably couple with the absorber tube 104. As such, the chain drive 135 provides an angular rotation to the absorber tube 104, in order to provide even reflected solar radiation exposure to the absorber tube 104, from the parabolic trough 102. In particular, the chain drive 135 does not provide a 360 degree range of motion to the absorber tube 104, rather an angular range of motion is pre-determined to suit the requirements of a particular site of employment of the power plant 100. In order to provide free rotatable movement to the absorber tube 104, an inlet manifold 160A is configured to be disposed between the first end 104A of the absorber tube 104 and the water inlet pipe 112, as illustrated in FIG. 1E. The inlet manifold 160A provides for independent rotation of the absorber tube 104, while still receiving water through the water inlet pipe 112. The inlet manifold 160A may include a track and swivel fitting, which allows for the helical pipe 108 to rotate, while receiving water from the water supply tank 110 via the water inlet pipe 112. In addition, corresponding to the inlet manifold 160A, an outlet manifold 160B is also configured to be disposed between the second end 104B of the absorber tube 104 and steam outlet. The outlet manifold 160B may also include a track and swivel fitting, similar to the inlet manifold 160A, in order for the free rotation of the absorber tube 104. The rotation of the absorber tube 104 ensures even heating of the helical pipe 108 included in the absorber tube 104, consequently, further improving the efficiency of the power plant 100. Moreover, a set of bearings may be used in between various fittings to make the rotation of the absorber tube 104, driven by the chain drive 135, more efficient, smooth, and maintenance free. In some aspects, the chain drive 135 may be replaced with a belt drive in order to better suit requirements of a particular area of employment of the power plant 100. The chain drive 135 or the belt drive may rotate the absorber tube 104 at a rotational speed selected from the group of 1 revolution per minute, 2 revolutions per minute, any one of 3 to 50 revolutions per minute. The rotational speed is related to a solar light intensity sensed by the light sensor shown in FIG. 2. For example, if the solar light intensity is high, generating for example 4 kW-hr/m$^2$, the rotational speed may be high, for example, 25 revolutions per minute. If the solar light intensity is low, generating for example 2 kW-hr/m$^2$, the rotational speed may be low, for example, 1 to 2 revolutions per minute.

Figure 1C:
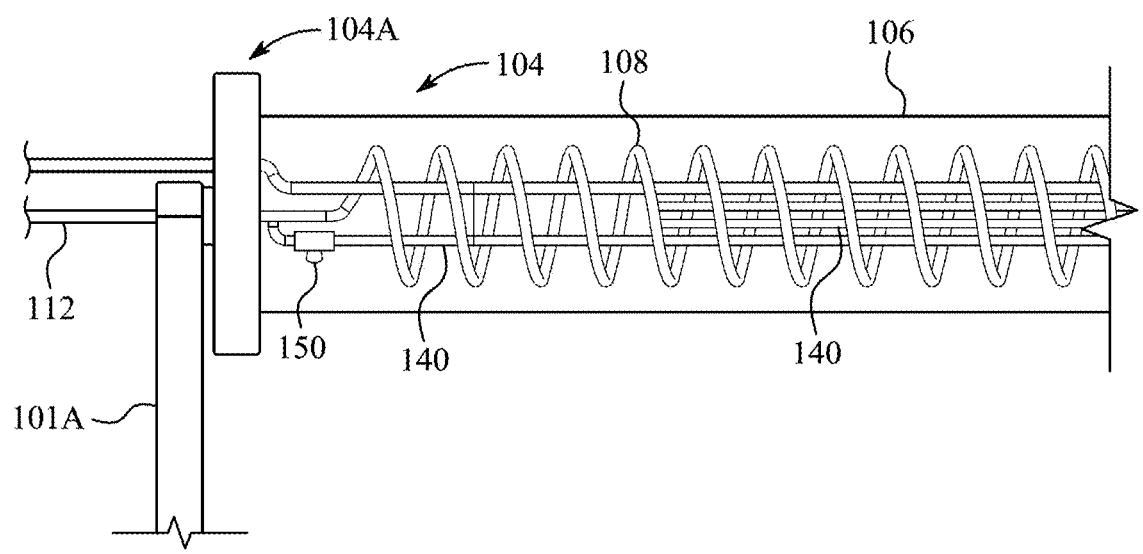
FIG. 1C illustrates an enlarged view of a portion of the absorber tube, according to certain embodiments.

Furthermore, referring to FIG. 1C, the absorber tube 104 includes an inner pipe 140 centered within the sand filled pipe 130 (not shown in FIG. 1C), as such, the inner pipe 140 extends from the first end 102A to the second end 102B of the parabolic trough 102 along the central axis 'A' of the glass pipe 106. In some aspects, the absorber tube 104 includes a solenoid valve 150 connected between the helical pipe 108 and the inner pipe 140. As such, the solenoid valve 150 is configured to block the water from entering the inner pipe 140 when the solenoid valve 150 is closed and release the water to the inner pipe 140 when the solenoid valve 150 is opened. In general, a solenoid valve is an electromechanically operated valve. Solenoid valves are separated by characteristics of electric current used, a strength of a magnetic field generated, and mechanism used to regulate fluid. In some aspects, the solenoid valve 150 may be a linear action type valve, a plunger-type actuator valve, a pivoted-armature actuator valve, and rocker actuator valve, or a combination thereof. In some aspects, the solenoid valve 150 may employ a two-port design to regulate a flow or a three port design to switch flows between ports. In some aspects, there may be more than one solenoid valve employed in the absorber tube 104. In some aspects, the solenoid valve 150 is programmable. The amount of water flowing through the solenoid valve 150 is adjustable via adjusting a size of an opening inside the solenoid valve 150 as per pre-determined requirements of the power plant 100. In some aspects, the parabolic trough 102 is configured to focus solar radiation upon the absorber tube 104 to heat the water in the helical pipe 108 and convert the water in the helical pipe 108 to steam when the solenoid valve 150 is closed. The parabolic trough 102 is further configured to focus the solar radiation upon the absorber tube 104 and heat the sand 132 in the sand filled pipe 130. In general, the heated sand may hold heat energy for elongated periods, permitting the power plant 100 to work efficiently during periods of low irradiance. In some aspects, during periods of high irradiance, the heated sand may act as an internal heat exchanger which heats the helical tube from the interior of the inner tube, thereby converting the steam in the helical tube to super-heated steam. Super-heated steam may be further utilized to drive a turbine attached to a dynamo in order to produce electricity.

Figure 1D:
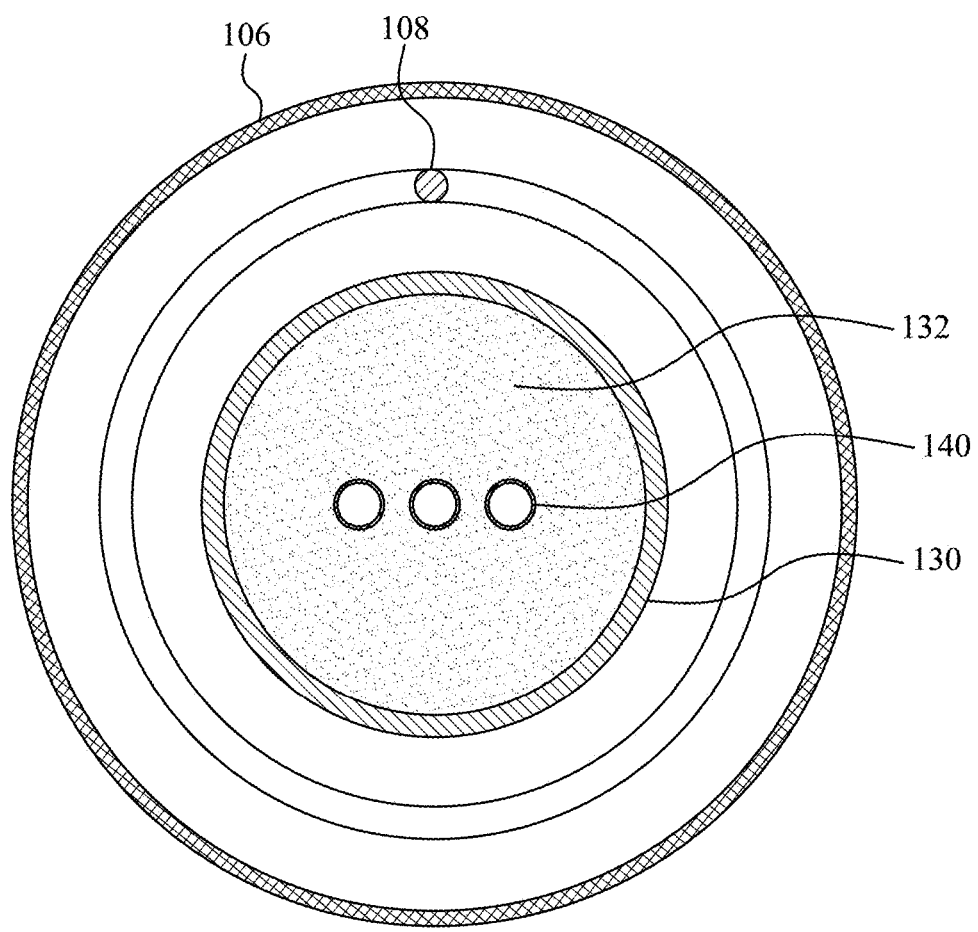
FIG. 1D is a schematic illustration of a cross-section of the absorber tube, according to certain embodiments.
Figure 1E:
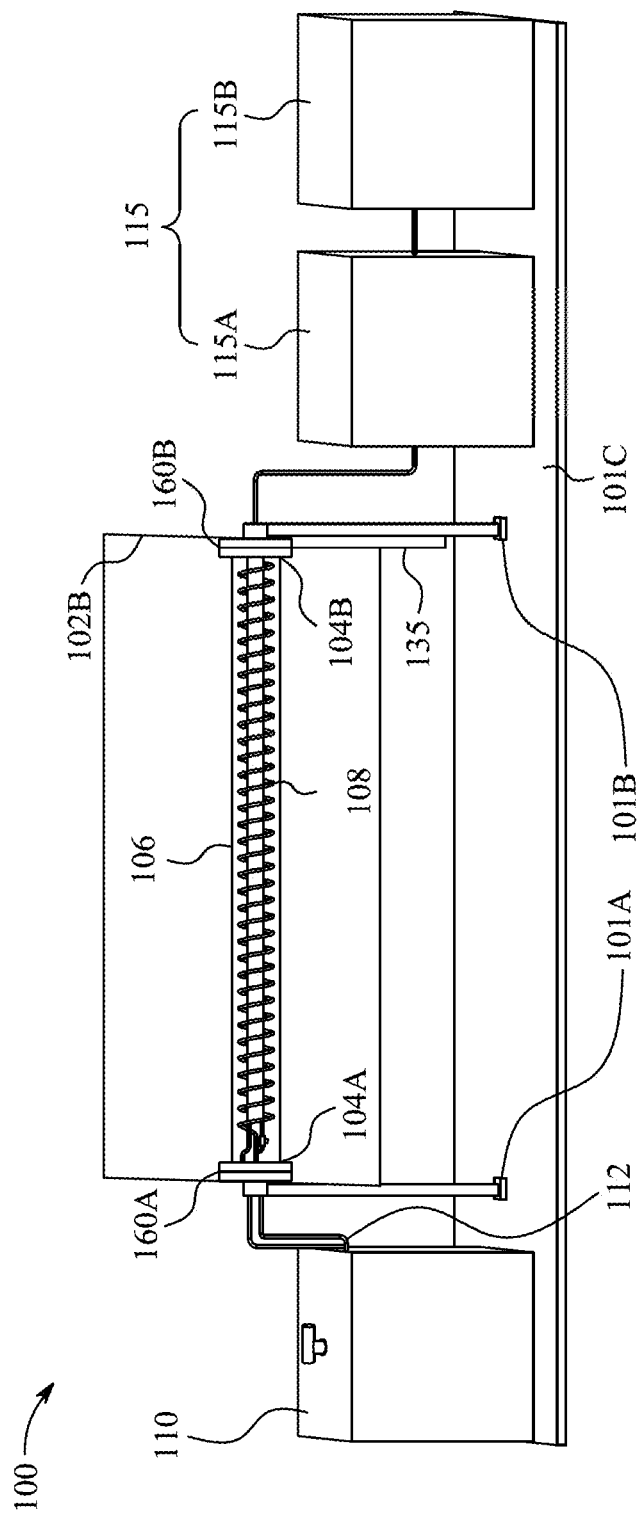
FIG. 1E is a schematic diagram of the parabolic trough solar power plant illustrating a chain drive for rotating the absorber tube, according to certain embodiments.

Referring to FIG. 1D, a schematic cross-sectional view of the absorber tube 104 is illustrated, according to certain aspects. The cross-sectional view depicts a schematic layout of the plurality of components included in the absorber tube 104. At the core, the absorber tube 104 includes the inner pipe 140. In some aspects, the inner pipe 140 has a serpentine shape which includes three pipe sections. In a non-limiting example, the overall length is about 2450 mm and the diameter is about 9.5 mm for the inner pipe, which is the same diameter as the helical pipes. In a non-limiting example, the diameter of each pipe section is as follows: the sand filled pipe has a diameter of about 76.2 mm, the glass pipe has the inner and outer diameter of about 190 mm and 200 mm respectively. The helical, inner and all the connecting pipes are made of copper with a uniform diameter of about 9.5 mm.

In general, the serpentine shape is highly efficient in heat exchange applications. In some aspects, the inner pipe 140 is manufactured using aluminium in order to have high heat exchange rates. However, in some aspects, the inner pipe 140 may be manufactured using other similar, high thermal conductive materials. As described above, the inner pipe 140 is enclosed by the sand filled pipe 130 throughout a length of the absorber tube 104. The sand filled pipe 130 may include a sand 132 with a high amount of quartz, large grains, minimal porosity, and significant moisture content. The aforementioned properties ensure a high heat transfer efficiency of the sand 132 in the sand filled pipe 130. In some aspects, the sand filled pipe 130 is configured to transfer heat stored in the sand 132 to the water in the inner pipe 140 and convert the water in the inner pipe 140 to steam when the solenoid valve 150 is opened. In one aspect, the sand filled pipe 130 may be manufactured using glass. In another aspect, the sand filled pipe 130 may be manufactured using a thermally conductive metal, such as, but not limited to, aluminium, copper, or a combination thereof. Furthermore, the sand filled pipe 130 is enclosed by the helical pipe 108. The helical pipe 108 is configured to provide a larger heating area for the water coming from the water supply tank 110. The helical pipe 108 may be manufactured using aluminium, copper, steel, or a combination thereof. As can be seen from FIG. 1D, the outermost layer of the absorber tube 104 is the glass pipe 106, which is manufactured using high quality weather resistant glass. The glass pipe 106 is configured to provide protection to the helical pipe 108, the sand filled pipe 130, and the inner pipe 140, from environmental factors such as rain, dust, and moisture while admitting a maximum intensity of solar radiation. The glass pipe 106 further protects the solenoid valve 150 from the aforementioned environmental factors and provides corrosion resistance to the absorber tube 104.

Figure 2:
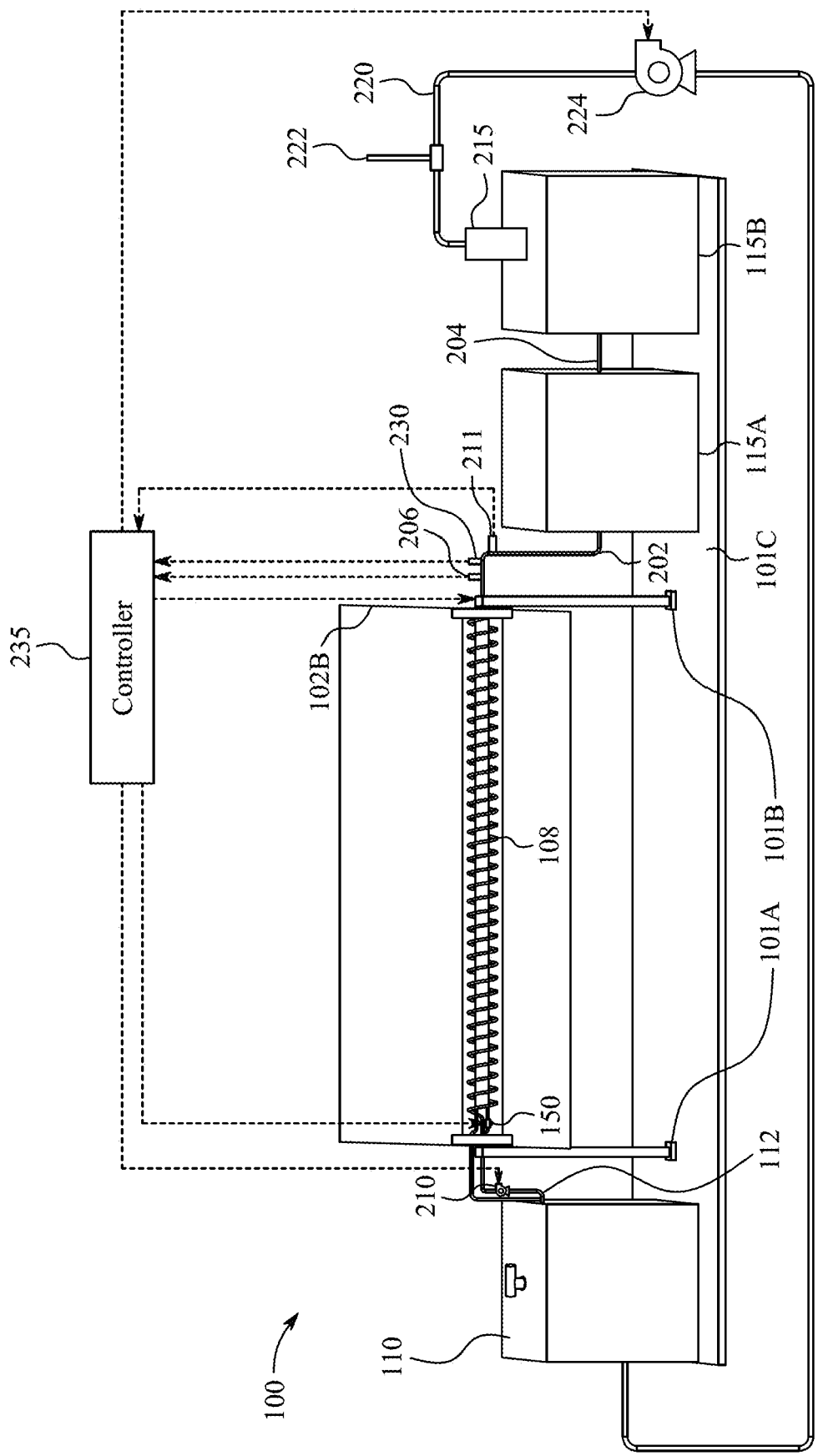
FIG. 2 is a schematic diagram illustrating a controller and plurality of sensors included in the parabolic trough solar power plant, according to certain embodiments.

Referring to FIG. 2, a schematic illustration of the power plant 100 including a plurality of electrical components is illustrated, according to certain aspects. In particular, the power plant 100 may include one or more sensors, one or more valves, one or more pumps, and the like. The power plant 100 further includes a steam outlet pipe 202. The steam outlet pipe 202 is connected to the helical pipe 108 at the second end 102B of the parabolic trough 102. As such, the steam outlet pipe 202 is configured to expel the steam in the helical pipe 108 into the steam holding tank. In particular, the steam outlet pipe 202 is configured to expel the steam into the first steam holding tank 115A. The first steam holding tank 115A and the second steam holding tank 115B are further interconnected via a steam passthrough pipe 204. Further, the absorber tube 104 includes a temperature sensor 206 operatively connected to the steam outlet pipe 202. The temperature sensor 206 is configured to measure a temperature of the steam exiting the steam outlet pipe 202 and to generate temperature data signals which cause the solenoid valve 150 to open when the temperature falls below 100 degrees Celsius (° C.). Furthermore, the power plant 100 includes a feed pump 210 operatively connected to the water supply tank 110, as such, the feed pump 210 is configured to pump the water from the water supply tank 110 to the water inlet pipe 112. In some aspects, the feed pump 210 is programmable, as per steam production requirements of the power plant 100. As such, an amount of water, from the water supply tank 110, being fed to the power plant 100 may be increased or decreased as per the steam production requirements of the power plant 100. In some aspects, the feed pump 210 may be a submersible pump, a centrifugal pump, a reciprocating pump, a rotary displacement pump, a positive displacement pump, or a combination thereof. In an aspects, a light sensor 211 may be installed near the chain drive 135 to measure the solar intensity. The light sensor 211 and the chain drive 135 (or alternative belt drive) may be operatively connected to the controller. The controller may use the intensity of the solar radiation, as sensed by the light sensor 211, to actuate the motor coupled with the chain drive 135, in order to adjust the parabolic trough 102 optimally with the incident solar radiation of the chain drive 135 (or alternative belt drive) as described above.

The absorber tube 104 further includes a pressure relief valve 215 located on the steam holding tank 115. In particular, the pressure relief valve 215 is disposed at a top surface of the second steam holding tank 115B. The pressure relief valve 215 is configured to release steam when the pressure in the steam holding tank 115 is greater than a pressure set point. The pressure set point is predetermined based on factors such as, but not limited to, capacity of steam holding tank 115, materials used in the construction of the steam holding tank 115, average solar radiation intensity and use of the power plant 100. The pressure is naturally balanced between the first steam holding tank 115A and the second steam holding tank 115B via the steam passthrough pipe 204. As such, the first steam holding tank 115A releases pressure into the second steam holding tank 115B via the steam passthrough pipe 204, where the pressure relief valve 215 releases extra steam pressure into the atmosphere in order to maintain safe pressure levels inside the power plant 100.

As can be seen from FIG. 2, the power plant 100 includes a bypass pipe 220 connected between the steam holding tank 115 and the water supply tank 110. The bypass pipe 220 is configured to fluidly couple with the water supply tank 110 and supply condensed water from the steam holding tank 115 to the water supply tank 110. The power plant 100 further includes a steam release pipe 222 connected between the pressure relief valve 215 and the bypass pipe 220. The steam release pipe 222 transmits excess steam to the water supply tank 110, which pre-heats the water in the water supply tank 110 for faster steam generation in the absorber tube 104, and which operates the system at highest thermal efficiency. Furthermore, a bypass pump 224 is connected to the bypass pipe 220. In some aspects, the bypass pump 224 is configured to pump condensed water from the steam holding tank 115 to the water supply tank 110 when the temperature falls below 100° C. In particular, the bypass pump 224 propels the condensed water from the second steam holding tank 115B to the water supply tank 110. Since the condensed water in the steam holding tanks 115 is already at a high temperature, the condensed water acts as a pre-heater for the water in the water supply tank 110, further enhancing the efficiency of the absorber tube 104. The bypass pump 224 may be a centrifugal pump, an electrically driven self-priming pump, a submersible pump, and the like. In some aspects, the power plant 100 includes a pressure sensor 230 located on the steam outlet pipe 202. The pressure sensor 230 is configured to send pressure data signals to a controller 235. The controller 235 is operatively connected to the pressure sensor 230, the temperature sensor 206, the feed pump 210, and the bypass pump 224. In some aspects, a type of the pressure sensor 230 may include, but not limited to, an elastic sensors, an electrical transducer, a differential pressure cell, and a vacuum pressure sensor. Further, a type of the temperature sensor 206 may include, but are not limited to, a thermistor, and a thermocouple. The details of the controller 235 and associated components are explained in detail with respect to FIGS. 6-9. In some aspects, the controller 235 includes electrical circuitry, a memory including program instructions and at least one processor configured to execute the program instructions to receive the pressure data signals and the temperature data signals and generate control signals which actuate the feed pump 210 and the bypass pump 224 based on the pressure data signals and the temperature data signals.

Figure 3A:
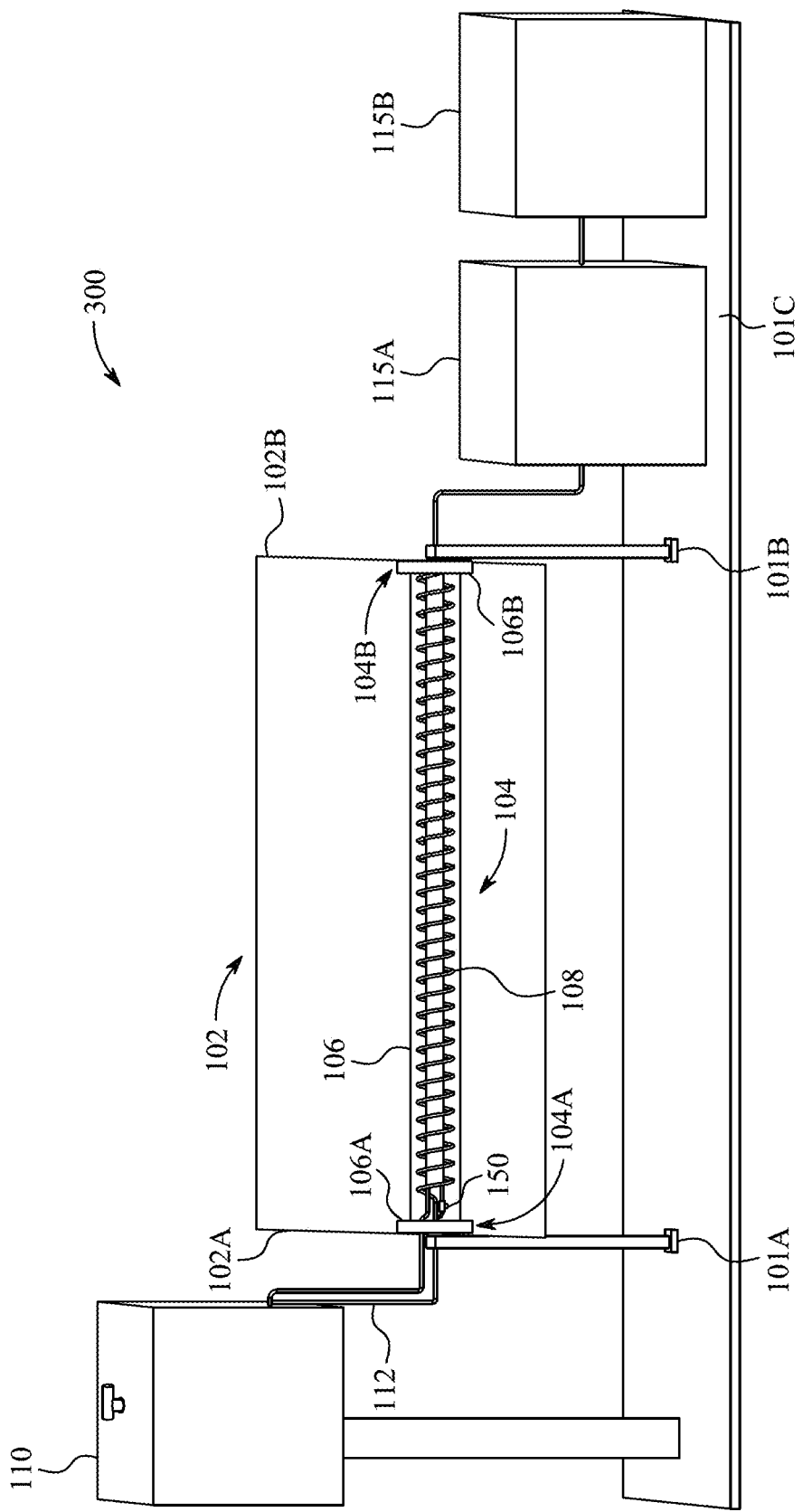
FIG. 3A is a schematic diagram depicting the parabolic trough solar power plant including a gravity feed, according to certain embodiments.

Referring to FIG. 3A, a schematic diagram of a power plant 300 is illustrated, according to an aspect of the present disclosure. In particular, the power plant 300 illustrates a gravity feed to transport the water from the water supply tank 110. In general, gravity feed is the use of gravity of the earth to move a liquid from one place to another. The water supply tank 110 is located above the absorber tube 104, as such, the water in the water supply tank 110 is transferred to the water inlet pipe 112 by a gravity feed. The water supply tank 110 is disposed at a pre-determined level, above the absorber tube 104, in order to generate optimum pressure for the water by gravitational force. The gravity feed causes the power plant 300 to be highly efficient, by eliminating a necessity of the feed pump 210. The gravity feed saves energy that may be used elsewhere in the power plant 300 to further increase efficiency and productivity.

Figure 3B:
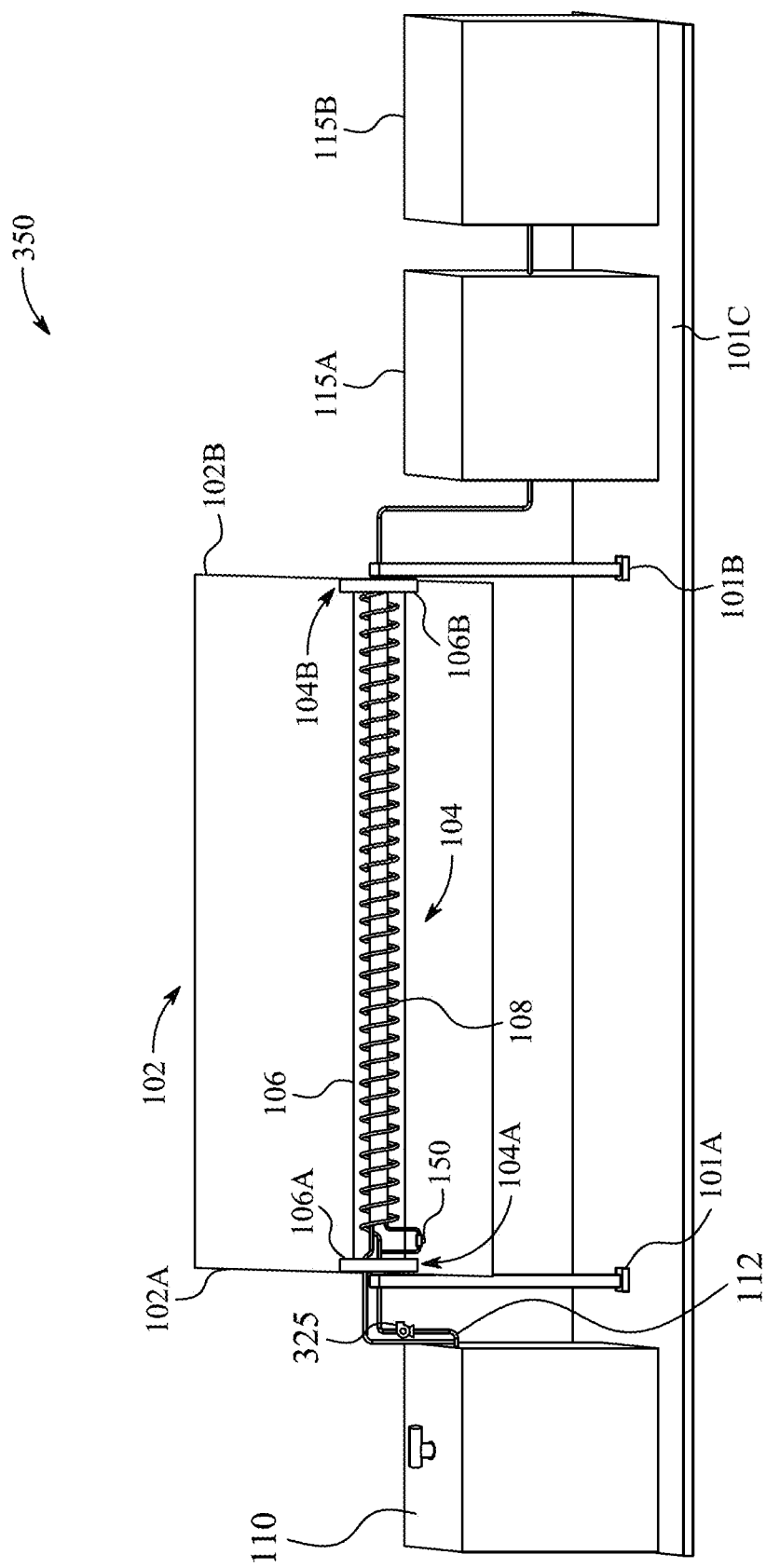
FIG. 3B is a schematic diagram depicting the parabolic trough solar power plant including a solenoid valve outside a glass pipe of the absorber tube, according to certain embodiments.

Referring to FIG. 3B, a schematic diagram of a power plant 350 is illustrated, according to certain aspects. The power plant 350 has many similarities with the power plant 100 and the power plant 300 depicted in FIG. 1 and FIG. 3A, respectively, such as integrating the plurality of components in the absorber tube 104, combining principles of thermodynamics and heat exchange to generate steam. The power plant 350 has the same key components as the power plant 100 and the power plant 300, with the exception that the water tank 110 is located at ground level and a pump 325 is configured to pump the water from the water tank 110 to the absorber tube. These components interact, generally, in a similar manner across all the power plants 100, 300, 350, leveraging heat exchange and mass transfer processes to achieve the desired steam generation outcomes. However, the power plant 350 includes the solenoid valve 150 configured to be disposed outside the glass pipe 106 for better access and manual intervention. The solenoid valve 150 of the power plant 350 is programmable as per the requirement of a particular area of employment of the power plant 350. In another aspect, the solenoid valve 150 may be replaced with a self-opening and self-closing thermostat valve. In general, thermostat valves are manufactured using corrosion resistant, highly conductive metals, designed to open above a pre-determined threshold temperature, and close, as the temperature falls below the pre-determined threshold temperature.

Figure 4:
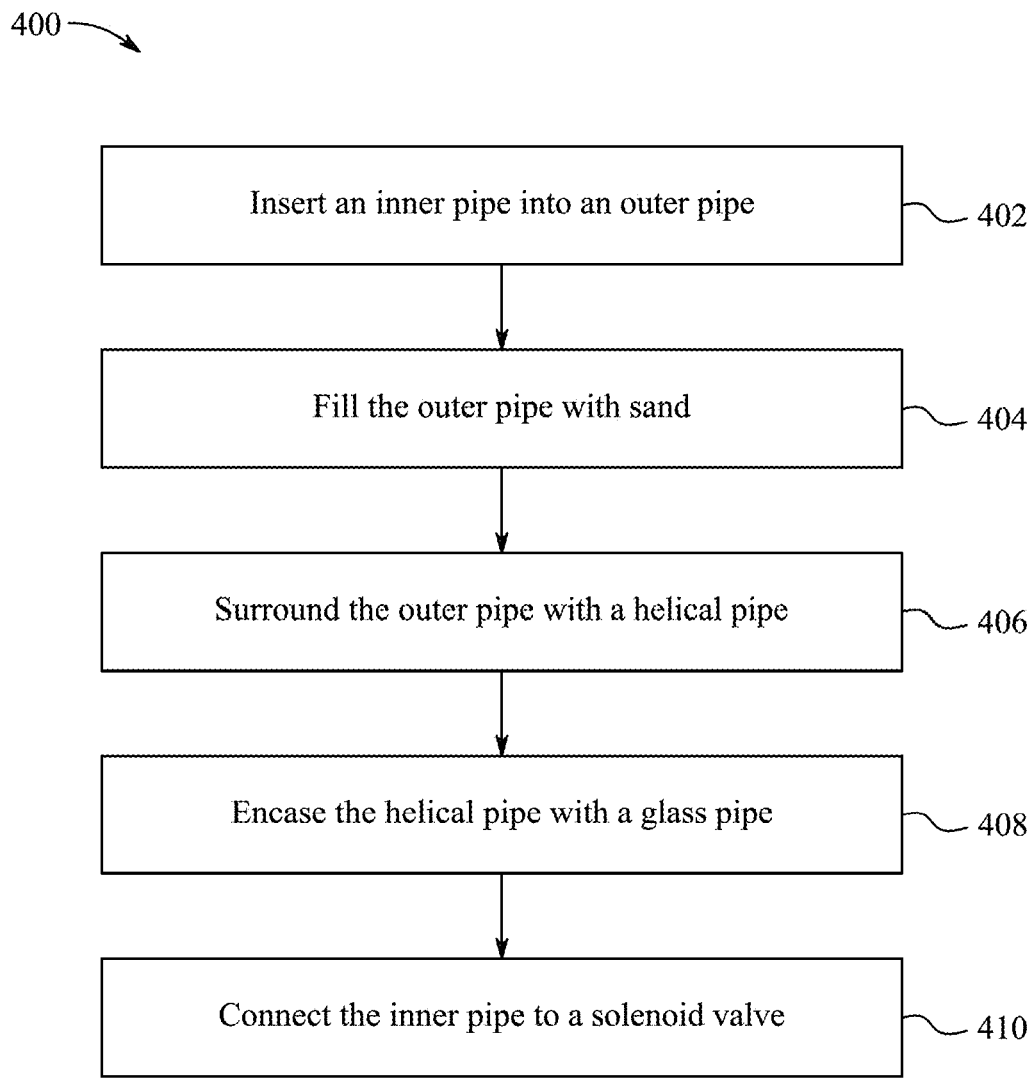
FIG. 4 is a flowchart depicting a method of assembling the absorber tube, according to certain embodiments.

Referring to FIG. 4, illustrated is a flowchart listing steps involved in a method (as represented by reference numeral 400) for assembling the absorber tube 104. These steps are only illustrative, and other alternatives may also be provided where one or more steps are added, one or more steps are removed, or one or more steps are provided in a different sequence without departing from the scope of the claims herein. Various aspects disclosed above, with respect to the aforementioned absorber tube 104, and the power plants 100, 300, apply mutatis mutandis to the method 400, as discussed in the proceeding paragraphs.

At step 402, the method 400 includes inserting the inner pipe 140 into the outer pipe 130. The inner pipe 140 is the serpentine pipe with the plurality of bends for heating water. The inner pipe 140 is configured to mechanically and fluidly couple with the first end 104A and the second end 104B of the absorber tube 104. In particular, the inner pipe 140 is attached to the absorber tube 104 via a mechanical joint, configured to perform optimally under high pressure and high temperature environments. A type of the mechanical joint may include, but is not limited to, a threaded joint, a soldering joint, a flanged joint, a brazed joint, a compression joint, and a socket joint. However, according to the present disclosure, the inner pipe 140 may be joined to the absorber tube 104 via a threaded joint. A sealant may further be employed at the threaded joint in order to prevent any leaks in a lifecycle of the power plant 100. At step 404, the method 400 includes filling the outer pipe 130 with the sand 132. The sand 132 may be a high quartz sand for favorable heat exchange properties. Further, the sand 132 is carefully selected as per its heat holding capacity in order to store the heat for elongated time periods. The sand 132 may be filled externally via a fill port before sealing the sand filled pipe 130. The sand filled pipe 130 is mechanically and detachably coupled with the first end 104A and the second end 104B of the absorber tube 104 via a compression joint or a socket welded joint. The socket welded joint is preferred since a threaded joint may not be feasible in case the sand filled pipe 130 is manufactured using glass. Further, at step 406, the method 400 includes surrounding the outer pipe 130 with the helical pipe 108. The helical pipe 108 may be designed off-site or on-site as per the requirements of a particular site of employment of the power plant 100. A number of turns in the helical pipe 108 may be adjusted in order to increase or decrease the area available for heating the water present in the helical pipe 108. At step 408, the method 400 includes encasing the helical pipe 108 with the glass pipe 106. The glass pipe 106 is detachably coupled with the first end 104A and the second end 104B of the absorber tube 104. A type of joint, included for coupling the glass pipe 106 with the absorber tube 104, may include, but is not limited to, flat joint, conically tapered joint, and ball-socket joint. Specialized glass fittings and seals are used to make the joint between the first end 104A, the second end 104B and the glass pipe 106 more robust and leak proof. Furthermore, at step 410, the method 400 includes connecting the inner pipe 140 to the solenoid valve 150, in order to realize the absorber tube 104. The solenoid valve 150 may be detachably coupled with the inner pipe 140 via a line joint. In order to make the solenoid valve 150 easily replaceable, a threaded joint may be considered for joining the solenoid valve, in-line, with the inner pipe 140. In some aspects, the types of joints used for joining various components, as described above, are not limited to the specific types of joints listed herein.

Figure 5:
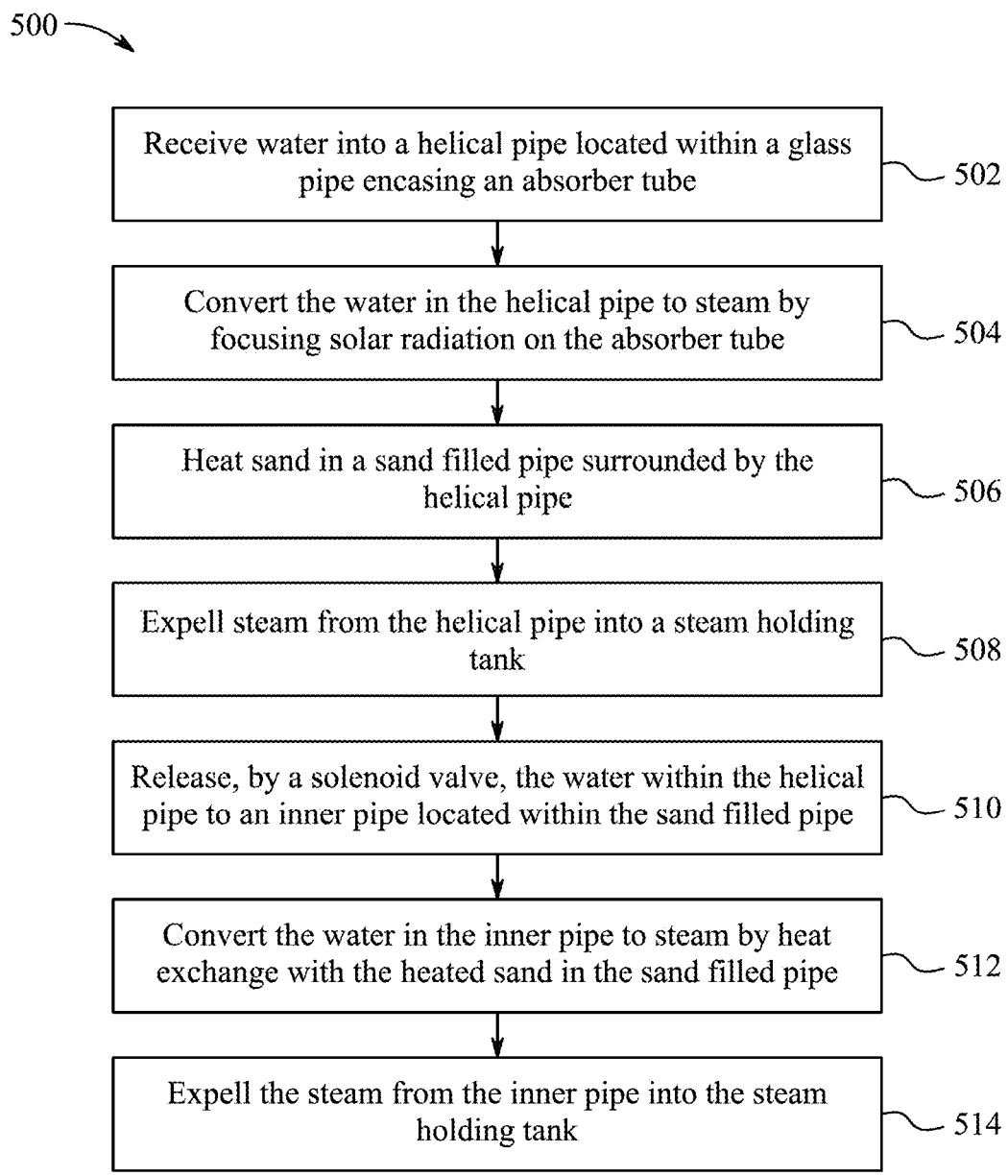
FIG. 5 is a flowchart depicting a method for generating steam in the absorber tube of the parabolic trough solar power plant, according to certain embodiments.

Referring to FIG. 5, illustrated is a flowchart listing steps involved in a method (as represented by reference numeral 500) for generating steam in the absorber tube 104 of the parabolic trough solar power plant 100. These steps are only illustrative, and other alternatives may also be provided where one or more steps are added, one or more steps are removed, or one or more steps are provided in a different sequence without departing from the scope of the claims herein. Various aspects disclosed above, with respect to the aforementioned absorber tube 104, and the power plants 100, 300, 350, apply to the method 500, as discussed in the proceeding paragraphs.

At step 502, the method 500 includes receiving water into the helical pipe 108 located within the glass pipe 106 encasing the absorber tube 104. As described above, the glass pipe 106 and the helical pipe 108 extend from the first end 102A to the second end 102B of the parabolic trough 102 along the central axis 'A' of the glass pipe 106. In some aspects, a central axis of the helical pipe 108 is concentric with the central axis 'A' of the glass pipe 106. The water from the water supply tank 110 is pumped via the feed pump 210. A pre-determined pressure of the water is maintained throughout work cycle of the power plants 100, 300, and 350. The feed pump 210 is selected based on its efficiency and longevity. A pump that may work continuously at optimal performance levels is preferred for the present disclosure. In some aspects, the water from the water supply tank 110 is received in the helical pipe 108 without assistance from the feed pump 210. This is achieved via feeding the water to the helical pipe 108 using gravity by placing the water supply tank 110 at a higher level than the absorber tube 104. At step 504, the method 500 includes converting the water in the helical pipe 108 to steam by focusing solar radiation on the absorber tube 104. In some aspects, incident solar radiation is collected by the parabolic trough 102. The parabolic shape of the parabolic trough 102 is achieved by lining reflective materials, such as, but not limited to, mirrors, metals, and alloys, in a parabolic frame. The parabolic trough 102 is designed in such a way that focuses maximum energy of the incident solar radiation upon the absorber tube 104 configured to be disposed longitudinally, in the middle of the parabolic trough 102. The absorber tube 104 further absorbs the solar radiation focused on the absorber tube 104 by the parabolic trough 102. The step 504 is carried out during periods of high irradiance, such as, day time and afternoon time. At step 506, the method 500 includes heating the sand 132 in the sand filled pipe 130 surrounded by the helical pipe 108 by the solar energy. The sand filled pipe 130 extends from the first end 102A to the second end 102B of the parabolic trough 102 along the central axis 'A' of the glass pipe 106. The sand 132 is enclosed in the sand filled pipe 130. As mentioned above, the sand filled pipe 130 may be manufactured using glass or a conductive metal. In particular, the sand filled pipe 130 absorbs heat energy from the solar radiation diverted by the parabolic trough 102, onto the absorber tube 104. The sand 132 has high heat storing capacity, such as, the sand 132 is capable of storing high amounts of heat energy, as received from the solar radiation, for elongated time periods to provide heat to the power plants 100, 300, and 350 during periods of low irradiance. At step 508, the method 500 includes expelling the steam from the helical pipe 108 into the steam holding tank 115. In particular, the steam generated by the absorber tube 104 is transferred to the steam outlet pipe 202, which is fluidly coupled with the first steam holding tank 115A. The steam outlet pipe 202 is mechanically and fluidly coupled with an outlet disposed at an end of the helical pipe 108 of the absorber tube 104, and an inlet, disposed at a side of the first steam holding tank 115A. The steam outlet pipe 202 is further secured with threaded joints and sealants to create a leak proof and durable joint between the helical pipe 108, the steam outlet pipe 202, and the first steam holding tank 115A. The steam is carried out through the steam outlet pipe 202 to the first steam holding tank 115A. In some aspects, the steam outlet pipe 202 may have more than one inlet, configured to receive steam from the inner pipe 140. Further, at step 510, the method 500 includes releasing, by the solenoid valve 150 connected between the helical pipe 108 and the inner pipe 140, water within the helical pipe 108 to the inner pipe 140 located within the sand filled pipe 130. The inner pipe is connected to the pipes which take the fluid to the water holding tanks. The water inside the inner pipe makes four passes to ensure efficient heat transfer and then it is dispatched as per the state of the water. The solenoid valve 150 is activated remotely, via the controller 235. The controller 235 senses optimal operating conditions, with assistance from the temperature sensor 206 and the pressure sensor 230, for the activation of the solenoid valve 150, consequently, transmits a signal to activate the solenoid valve 150. In some aspects, the step 510 is carried out during periods of low irradiance, such as evening and night time, when an intensity of the sunlight incident on the parabolic trough 102 is low. At step 512, the method 500 includes converting the water in the inner pipe 140 to steam by heat exchange with the heated sand 132 in the sand filled pipe 130. In some aspects, the water in the inner pipe 140 is pre-heated, as such, the water in the inner pipe 140 is received from the helical pipe 108, at an elevated temperature. The elevated temperature assists the sand 132, which is also heated from the incident solar radiation on the parabolic trough, in heating the water and converting it to steam inside the inner pipe 140. The sand 132 may reach extremely high temperatures and cause a change of state of the water from liquid to gas, consequently generating steam. At step 514, the method 500 includes expelling the steam from the inner pipe 140 into the steam holding tank 115. In some aspects, the steam is expelled from the inner pipe 140 to the steam holding tank 115 via the steam outlet pipe 202. As mentioned above, the steam outlet pipe 202 is mechanically and fluidly coupled with the first steam holding tank 115A. As such, one end of the steam outlet pipe 202 is configured to receive the steam from the inner pipe 140. In particular, when steam pressure is increased inside the inner pipe 140, by virtue of thermodynamic principles, the steam travels to low pressure areas naturally, such as the steam holding tank 115, via the steam outlet pipe 202. The valve used is a solenoid valve controlled by two sensors. As the intensity and the angle of irradiance changes and the heat accumulated gets lower, the valve will close and allow the water to flow towards the inner pipe rather than the helical pipe. This switch is controlled based on two parameters: the angle of irradiance and the temperature on the outlet of the helical pipe.

In one aspect, shown in FIG. 3B, the method 500 includes pumping, by the feed pump 210 connected to the water supply tank 110, water from the water supply tank 110 through the water inlet pipe 112 into the helical pipe 108. Further, the method 500 includes receiving the water into the helical pipe 108 through the water inlet pipe 112 connected to the water supply tank 110. In another aspect of the present disclosure, shown in FIG. 3A, the water supply tank 110 is located above the parabolic trough 102, gravity feeding the water from the water supply tank 110 through the water inlet pipe 112.

The method 500 further includes measuring, by the temperature sensor 206 operatively connected to the steam outlet pipe 202, the temperature of the steam exiting the steam outlet pipe 202 and generating, by the temperature sensor 206, temperature data signals when the temperature falls below 100° C. Furthermore, the method 500 includes receiving, by the solenoid valve 150, the temperature data signals and opening, by the solenoid valve 150, the inner pipe 140. In particular, the temperature sensor 206 is configured to generate and transmit the temperature signal from the steam outlet pipe 202 to the controller 235. The controller 235 analyzes the temperature signal received from the temperature sensor 206, in order determine when to open or close the solenoid valve 150, thus controlling the flow of the water to the inner pipe 140. In an example, if the temperature dips below 100° C., the controller 235 sends a signal to the solenoid valve 150 to permit the flow of the water to the inner pipe 140, conversely, if the temperature rises above 100° C., the controller 235 sends a signal to restrict the flow of the water to the inner pipe 140. The aforementioned operation is carried out in order to improve the efficiency of the power plants 100, 300 and 350. In addition, the method 500 includes pumping, by the bypass pump 224 connected to the bypass pipe 220, condensed water from the steam holding tank 115 to the water supply tank 110 when the temperature falls below 100° C. The method 500 further includes measuring, by the pressure sensor 230 located on the steam outlet pipe 202, pressure data signals. The pressure data signals corresponds to a steam pressure generated by the absorber tube 104. Further the method includes receiving, by the controller 235 including electrical circuitry, the memory including program instructions and the at least one processor configured to execute the program instructions, the pressure data signals, and the temperature data signals. Further, the method 500 includes generating, by the controller 235, control signals for actuating the feed pump 210 and the bypass pump 224 based on the pressure data signals and the temperature data signals, as generated by the pressure sensor 230 and the temperature sensor 206, respectively.

The aspects of the present disclosure provide the absorber tube 104 for the parabolic trough solar power plant 100. The absorber tube 104 includes the plurality of components to generate steam in an environmentally friendly manner. The present disclosure provides a feasible solution which can be applied to solve the global energy demand and shortage of fossil fuels. Since, solar energy is a renewable resource, the absorber tube 104 has minimal economical constrictions. The absorber tube 104 is designed to be low maintenance, highly reliable, and consistent. The design of the absorber tube 104 permits for retrofitting to existing parabolic trough solar power plants. Further, the present disclosure provides a way of adjusting the parabolic trough 102, as such, the parabolic trough 102 receives optimal solar radiation at all times during periods of high irradiance, further enhancing the efficiency of the power plant 100, 300, and 350. In some aspects, the present disclosure may be capable of producing super-heated steam. The absorber tube 104 may be an efficient device to harness abundantly available renewable solar energy, and the harnessed energy may be modified to be consumed in a beneficial manner.

The first aspect of the present disclosure is illustrated with respect to FIG. 1A through FIG. 2. The first aspect describes the absorber tube 104 for the parabolic trough solar power plant 100, including the glass pipe 106 which extends from the first end 102A to the second end 102B of the parabolic trough 102, the helical pipe 108 enclosed within the glass pipe 106, wherein the helical pipe 108 extends from the first end 102A to the second end 102B of the parabolic trough 102 along the central axis 'A' of the glass pipe 106, wherein the helical pipe 108 is configured to hold water, the sand filled pipe 130 surrounded by the helical pipe 108, wherein the sand filled pipe 130 extends from the first end 102A to the second end 102B of the parabolic trough 102 along the central axis 'A' of the glass pipe 106, the inner pipe 140 centered within the sand filled pipe 130, wherein the inner pipe 140 extends from the first end 102A to the second end 102B of the parabolic trough 102 along the central axis 'A' of the glass pipe 106, and the solenoid valve 150 connected between the helical pipe 108 and the inner pipe 140, wherein the solenoid valve 150 is configured to block the water from entering the inner pipe 140 when the solenoid valve 150 is closed and release the water to the inner pipe 140 when the solenoid valve 150 is opened.

In some aspects, the absorber tube 104 further includes the water inlet pipe 112 connected to the helical pipe 108 at the first end 102A of the parabolic trough 102, wherein the water inlet pipe 112 is configured to receive water from a water supply tank 110.

In some aspects, the absorber tube 104 further includes the feed pump 210 operatively connected to the water supply tank 110, wherein the feed pump 210 is configured to pump the water from the water supply tank 110 to the water inlet pipe 112.

In some aspects, the water supply tank 110 is located above the absorber tube 104, wherein water in the water supply tank 110 is transferred to the water inlet pipe 112 by a gravity feed.

In some aspects, the parabolic trough 102 is configured to focus solar radiation upon the absorber tube 104 to heat the water in the helical pipe 108 and convert the water in the helical pipe 108 to steam when the solenoid valve 150 is closed.

In some aspects, the absorber tube 104, wherein the parabolic trough 102 is further configured to focus the solar radiation upon the absorber tube 104 and heat the sand 132 in the sand filled pipe 130.

In an aspect, the sand filled pipe 130 is configured to transfer the heat stored in the sand 132 to the water in the inner pipe 140 and convert the water in the inner pipe 140 to steam when the solenoid valve 150 is opened.

In some aspects, the absorber tube 104 further includes the steam outlet pipe 202 connected to the helical pipe 108 at the second end 102B of the parabolic trough 102, wherein the steam outlet pipe 202 is configured to expel the steam in the helical pipe 108 into steam holding tank 115.

In some aspects, the absorber tube 104 further includes the temperature sensor 206 operatively connected to the steam outlet pipe 202, wherein the temperature sensor 206 is configured to measure the temperature of the steam exiting the steam outlet pipe 202 and to generate temperature data signals which cause the solenoid valve 150 to open when the temperature falls below 100 degrees Celsius (° C.).

In some aspects, the absorber tube 104 further includes the pressure relief valve 215 located on the steam holding tank 115, wherein the pressure relief valve 215 is configured to release steam when the pressure in the steam holding tank 115 is greater than a pressure set point.

In some aspects, the absorber tube 104 further includes the bypass pipe 220 connected between the steam holding tank 115 and the water supply tank 110, the steam release pipe 222 connected between the pressure relief valve 215 and the bypass pipe 220, the bypass pump 224 connected to the bypass pipe 220, wherein the bypass pump 224 is configured to pump condensed water from the steam holding tank 115 to the water supply tank 110 when the temperature falls below 100° C.

In some aspects, the absorber tube 104 further includes the pressure sensor 230 located on the steam outlet pipe 202, wherein pressure sensor 230 is configured to send pressure data signals and the controller 235 operatively connected to the pressure sensor 230, the temperature sensor 206, the feed pump 210 and the bypass pump 224, wherein the controller 235 includes electrical circuitry, a memory including program instructions and at least one processor configured to execute the program instructions to receive the pressure data signals and the temperature data signals and generate control signals which actuate the feed pump 210 and the bypass pump 224 based on the pressure data signals and the temperature data signals.

In some aspects, the inner pipe 140 has a serpentine shape including a plurality of bends.

The second aspect of the present disclosure is illustrated with respect to FIG. 5. The second aspect describes a method 500 for generating steam in the absorber tube 104 of the parabolic trough solar power plant 100. The method 500 includes receiving water into the helical pipe 108 located within the glass pipe 106 encasing the absorber tube 104, wherein the glass pipe 106 and the helical pipe 108 extend from the first end 102A to the second end 102B of the parabolic trough 102 along the central axis 'A' of the glass pipe 106 and the central axis of the helical pipe 108 is concentric with the central axis 'A' of the glass pipe106. During periods of high irradiance, converting the water in the helical pipe 108 to steam by focusing solar radiation on the absorber tube104, heating sand in a sand filled pipe 130 surrounded by the helical pipe 108, wherein the sand filled pipe 130 extends from the first end 102A to the second end 102B of the parabolic trough 102 along the central axis 'A' of the glass pipe 106, expelling the steam from the helical pipe 108 into the steam holding tank 115. During periods of low irradiance, releasing, by the solenoid valve 150 connected between the helical pipe 108 and the inner pipe 140, water within the helical pipe 108 to the inner pipe 140 located within the sand filled pipe 130, and converting the water in the inner pipe 140 to steam by heat exchange with the heated sand in the sand filled pipe 130, and expelling the steam from the inner pipe 140 into the steam holding tank 115.

In some aspects, the method 500 further includes receiving the water into the helical pipe 108 through the water inlet pipe 112 connected to the water supply tank 110, wherein the water supply tank 110 is located above the parabolic trough 102, and gravity feeding the water from the water supply tank 110 through the water inlet pipe 112.

In some aspects, the method 500 further includes pumping, by the feed pump 210 connected to the water supply tank 110, water from the water supply tank 110 through the water inlet pipe 112 into the helical pipe 108.

In some aspects, the method 500 further includes measuring, by the temperature sensor 206 operatively connected to steam outlet pipe 202, the temperature of the steam exiting the steam outlet pipe 202, generating, by the temperature sensor 206, temperature data signals when the temperature falls below 100° C., and receiving, by the solenoid valve 150, the temperature data signals, and opening, by the solenoid valve 150, the inner pipe 140.

In some aspects, the method 500 further includes pumping, by the bypass pump 224 connected to the bypass pipe 220, condensed water from the steam holding tank 115 to the water supply tank 110 when the temperature falls below 100° C.

In some aspects, the method 500 further includes measuring, by the pressure sensor 230 located on the steam outlet pipe 202, pressure data signals, receiving, by the controller 235 including electrical circuitry, a memory including program instructions and at least one processor configured to execute the program instructions, the pressure data signals and the temperature data signals, and generating, by the controller 235, control signals for actuating the feed pump 210 and the bypass pump 224 based on the pressure data signals and the temperature data signals.

The third aspect of the present disclosure is illustrated with respect to FIG. 4. The third aspect describes a method 400 for assembling the absorber tube 104. The method 400 includes inserting the inner pipe 140 into the outer pipe 130 filling the outer pipe 130 with sand, surrounding the outer pipe 130 with the helical pipe 108, encasing the helical pipe 108 with the glass pipe 106, and connecting the inner pipe 140 to a solenoid valve 150.

Figure 6:
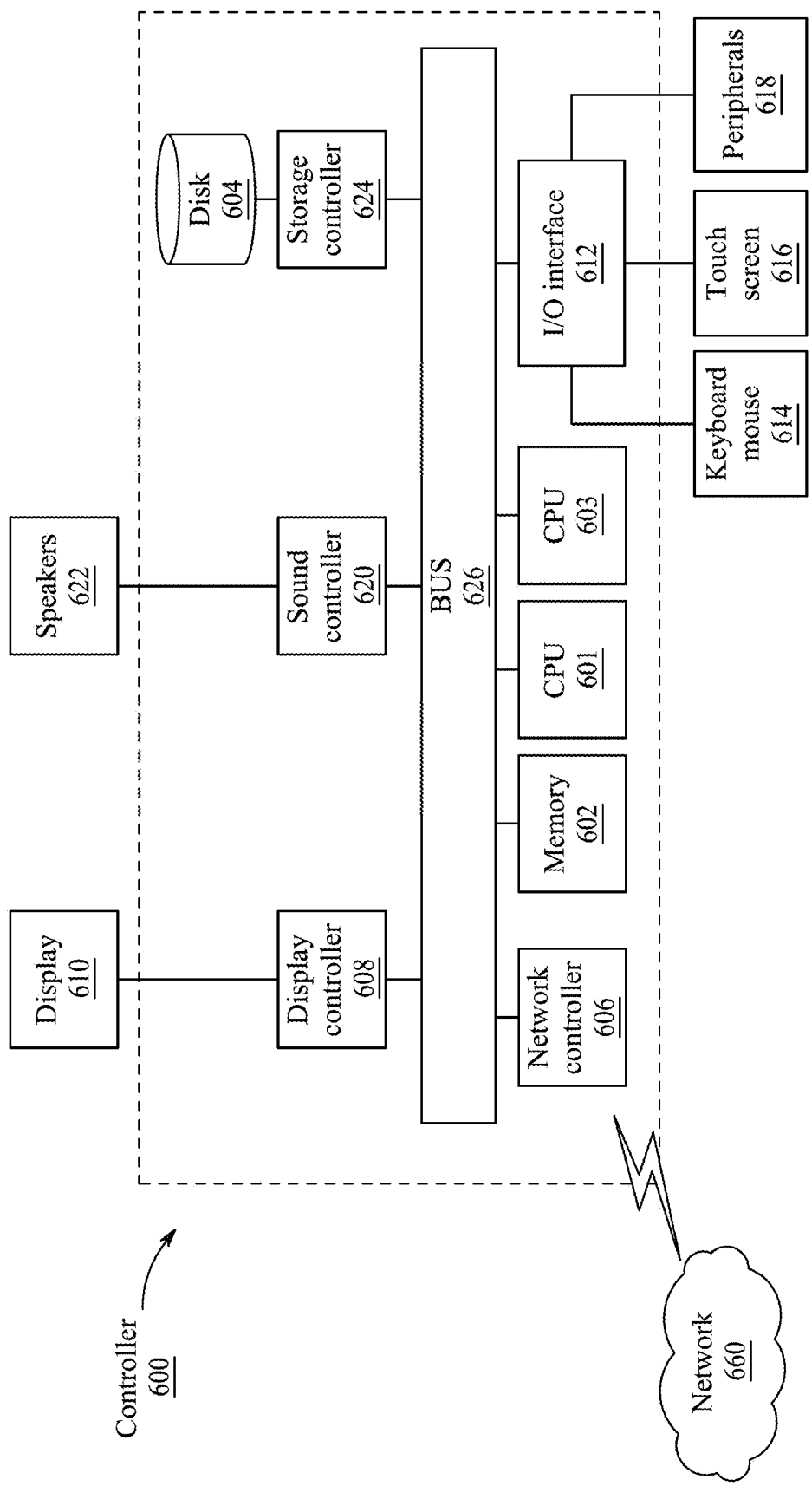
FIG. 6 is an illustration of a non-limiting example of details of computing hardware used in a computing system of the parabolic trough solar power plant, according to certain embodiments.

Next, further details of the hardware description of the computing environment according to exemplary aspects is described with reference to FIG. 6. In FIG. 6, the controller 600 is representative of the controller 235 of the powerplant 100 in which the controller 600 is a computing device which includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, Microsoft Windows 10, Microsoft Windows 11,UNIX, Solaris, LINUX, Apple MAC-OS and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skill in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As may be appreciated, the network 660 may be a public network, such as the Internet, or a private network such as an LAN or WAN network, or any combination thereof and may also include PSTN or ISDN sub-networks. The network 660 may also be wired, such as an Ethernet network, or may be wireless such as a cellular network including EDGE, 3G, 4G and 5G wireless cellular systems. The wireless network may also be Wi-Fi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
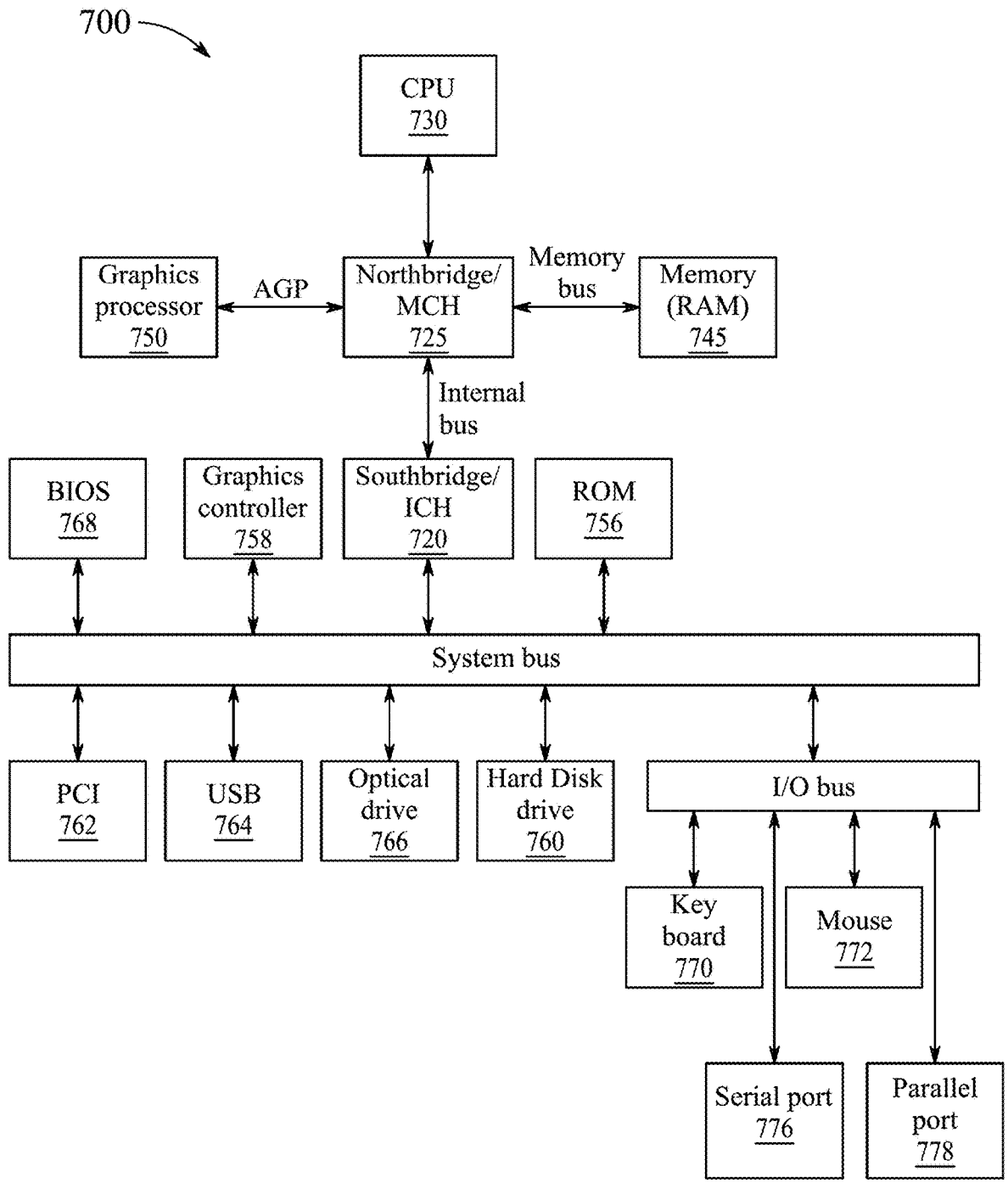
FIG. 7 is an exemplary schematic diagram of a data processing system used within the computing system, according to certain embodiments.

FIG. 7 shows a schematic diagram of a data processing system, according to certain aspects, for performing the functions of the exemplary aspects. The data processing system is an example of a computer in which code or instructions implementing the processes of the illustrative aspects may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus and connects to the graphics processor 750 via an accelerated graphics port (AGP). The NB/MCH 725 also connects to the SB/ICH 720 via an internal bus (such as, a unified media interface or a direct media interface). The CPU Processing unit 730 may contain one or more processors and even may be implemented using one or more heterogeneous processor systems.

Figure 8:
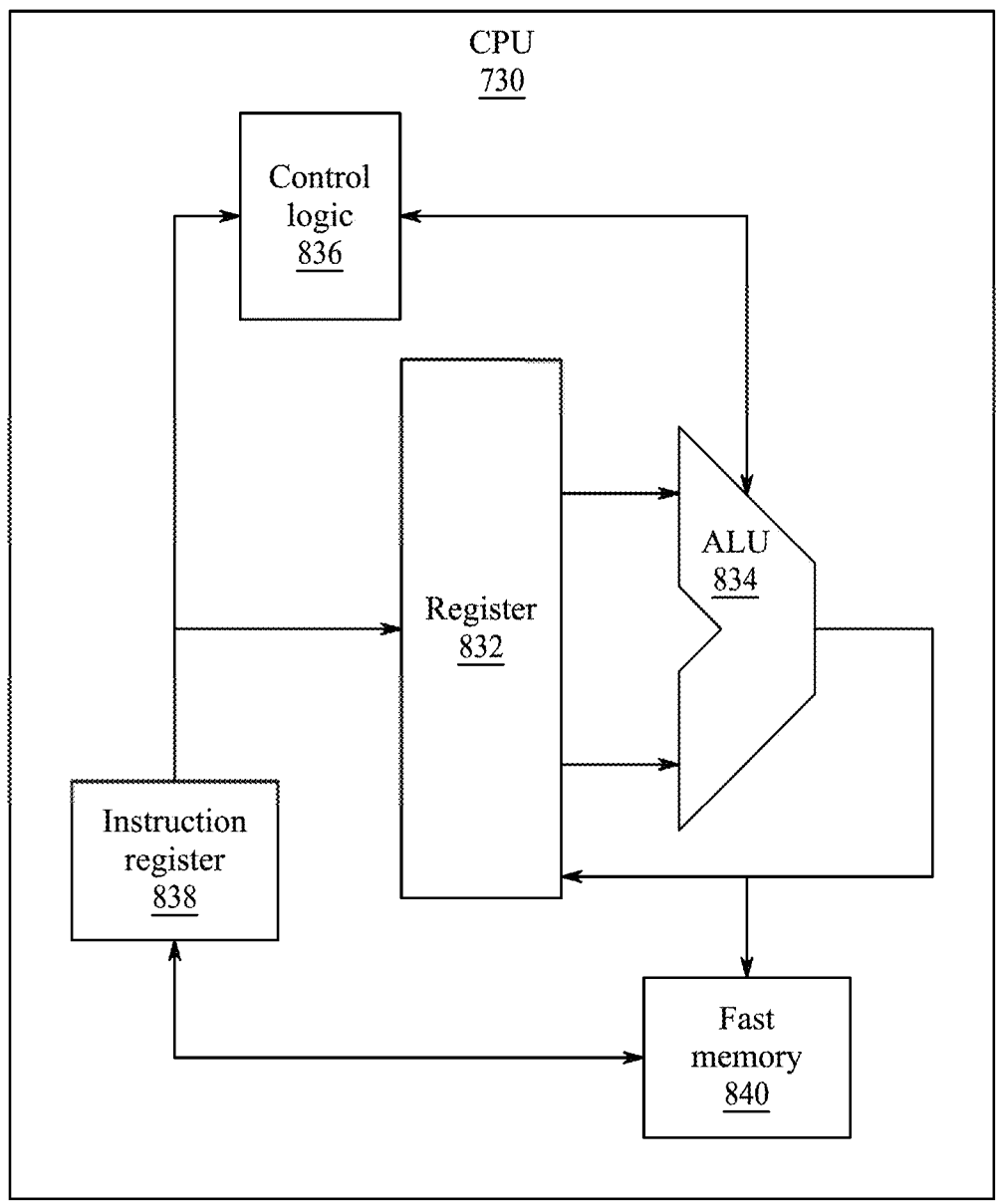
FIG. 8 is an exemplary schematic diagram of a processor used with the computing system, according to certain embodiments.

For example, FIG. 8 shows one implementation of CPU 730. In one implementation, the instruction register 838 retrieves instructions from the fast memory 840. At least part of these instructions are fetched from the instruction register 838 by the control logic 836 and interpreted according to the instruction set architecture of the CPU 730. Part of the instructions may also be directed to the register 832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations may be feedback into the register and/or stored in the fast memory 840. According to certain implementations, the instruction set architecture of the CPU 730 may use a reduced instruction set architecture, a complex instruction set architecture, a vector processor architecture, a very large instruction word architecture. Furthermore, the CPU 730 may be based on the Von Neuman model or the Harvard model. The CPU 730 may be a digital signal processor, an FPGA, an ASIC, a PLA, a PLD, or a CPLD. Further, the CPU 730 may be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 may include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices may also be coupled to SB/ICH 788 through a PCI bus 762.

The PCI devices may include, for example, Ethernet adapters, add-in cards, and PC cards for notebook computers. The Hard disk drive 760 and CD-ROM 766 may use, for example, an integrated drive electronics (IDE) or serial advanced technology attachment (SATA) interface. In one implementation the I/O bus may include a super I/O (SIO) device.

Further, the hard disk drive (HDD) 760 and optical drive 766 may also be coupled to the SB/ICH 720 through a system bus. In one implementation, a keyboard 770, a mouse 772, a parallel port 778, and a serial port 776 may be connected to the system bus through the I/O bus. Other peripherals and devices that may be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 9:
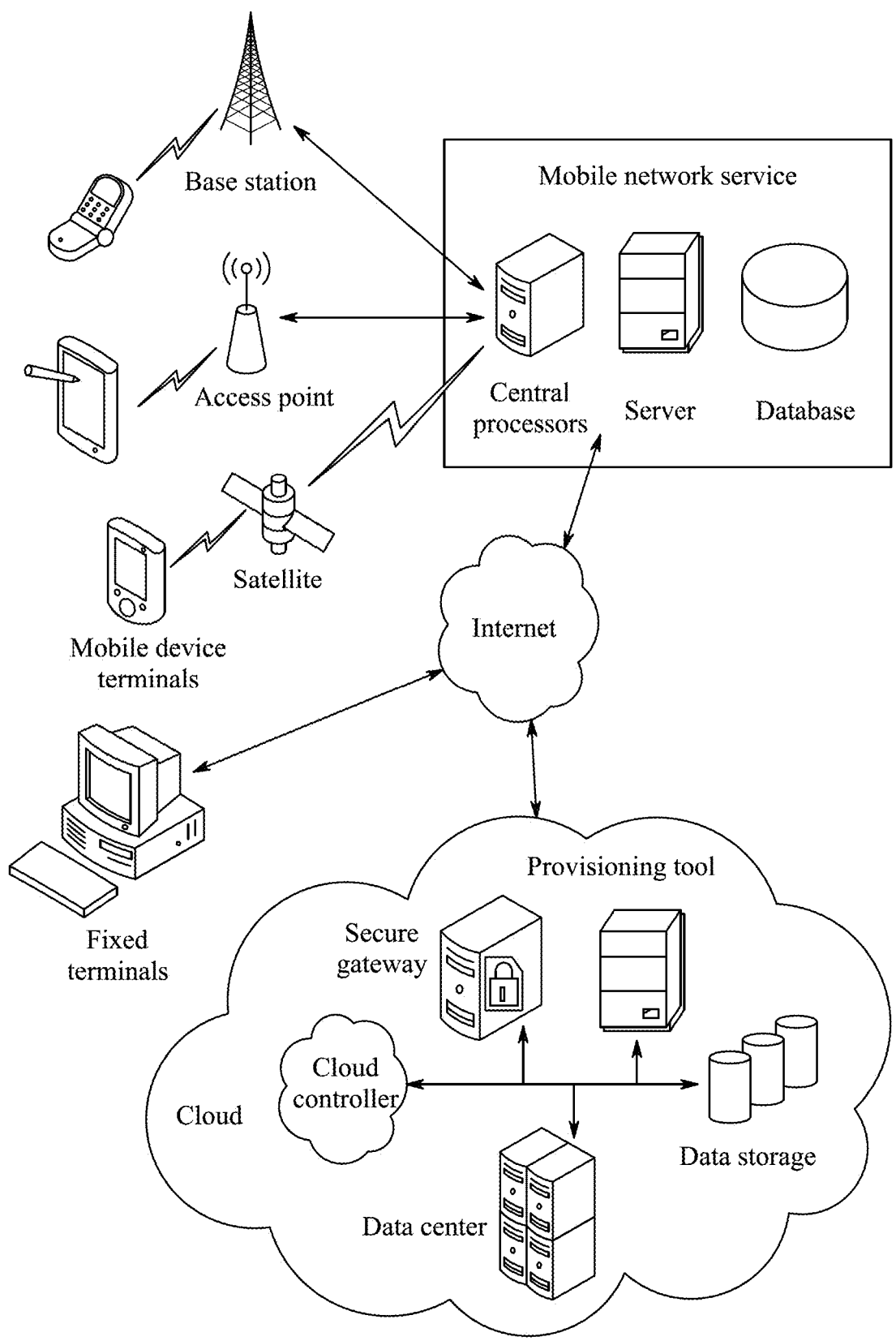
FIG. 9 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An absorber tube for a parabolic trough solar power plant, comprising:
   a glass pipe which extends from a first end to a second end of a parabolic trough;
   a helical pipe enclosed within the glass pipe, wherein the helical pipe extends from the first end to the second end of the parabolic trough along a central axis of the glass pipe, wherein the helical pipe is configured to hold water;
   a sand filled pipe surrounded by the helical pipe, wherein the sand filled pipe extends from the first end to the second end of the parabolic trough along the central axis of the glass pipe;
   an inner pipe centered within the sand filled pipe, wherein the inner pipe extends from the first end to the second end of the parabolic trough along the central axis of the glass pipe; and
   a solenoid valve connected between the helical pipe and the inner pipe, wherein the solenoid valve is configured to block the water from entering the inner pipe when the solenoid valve is closed and release the water to the inner pipe when the solenoid valve is opened,
   a water inlet pipe connected to the helical pipe at the first end of the parabolic trough, wherein the water inlet pipe is configured to receive water from a water supply tank,
   wherein the parabolic trough is configured to focus solar radiation upon the absorber tube to heat the water in the helical pipe and convert the water in the helical pipe to steam when the solenoid valve is closed, and to heat the sand in the sand filled pipe,
   wherein the sand filled pipe is configured to transfer the heat stored in the sand to the water in the inner pipe and convert the water in the inner pipe to steam when the solenoid valve is opened
   a steam outlet pipe connected to the helical pipe at the second end of the parabolic trough, wherein the steam outlet pine is configured to expel the steam in the helical pipe into a steam holding tank, and
   a temperature sensor operatively connected to the steam outlet pipe, wherein the temperature sensor is configured to measure a temperature of the steam exiting the steam outlet pipe and to generate temperature data signals which cause the solenoid valve to open when the temperature falls below 100° C.

2. The absorber tube of claim 1, further comprising:
   a feed pump operatively connected to the water supply tank, wherein the feed pump is configured to pump the water from the water supply tank to the water inlet pipe.

3. The absorber tube of claim 1, wherein the water supply tank is located above the absorber tube, wherein the water in the water supply tank is transferred to the water inlet pipe by a gravity feed.

4. The absorber tube of claim 1, further comprising:
   a pressure relief valve located on the steam holding tank, wherein the pressure relief valve is configured to release steam when the pressure in the steam holding tank is greater than a pressure set point.

5. The absorber tube of claim 4, further comprising;
   a bypass pipe connected between the steam holding tank and the water supply tank;
   a steam release pipe connected between the pressure relief valve and the bypass pipe;
   a bypass pump connected to the bypass pipe, wherein the bypass pump is configured to pump condensed water from the steam holding tank to the water supply tank when the temperature falls below 100° C.

6. The absorber tube of claim 5, further comprising:
a pressure sensor located on the steam outlet pipe, wherein the pressure sensor is configured to send pressure data signals; and
a controller operatively connected to the pressure sensor, the temperature sensor, the feed pump and the bypass pump, wherein the controller includes electrical circuitry, a memory including program instructions and at least one processor configured to execute the program instructions to receive the pressure data signals and the temperature data signals and generate control signals which actuate the feed pump and the bypass pump based on the pressure data signals and the temperature data signals.

7. The absorber tube of claim 1, wherein the inner pipe has a serpentine shape comprising a plurality of bends.

8. A method for generating steam in an absorber tube of a parabolic trough solar power plant, comprising:
receiving water into a helical pipe located within a glass pipe encasing the absorber tube, wherein the glass pipe and the helical pipe extend from a first end to a second end of a parabolic trough along a central axis of the glass pipe and a central axis of the helical pipe is concentric with the central axis of the glass pipe;
during periods of high irradiance:
converting the water in the helical pipe to steam by focusing solar radiation on the absorber tube;
heating sand in a sand filled pipe surrounded by the helical pipe, wherein the sand filled pipe extends from the first end to the second end of the parabolic trough along the central axis of the glass pipe;
expelling the steam from the helical pipe into steam holding tanks;
during periods of low irradiance:
releasing, by a solenoid valve connected between the helical pipe and an inner pipe, the water within the helical pipe to the inner pipe located within the sand filled pipe; and
converting the water in the inner pipe to steam by heat exchange with the heated sand in the sand filled pipe; and
expelling the steam from the inner pipe into the steam holding tanks.

9. The method of claim 8, further comprising:
receiving the water into the helical pipe through a water inlet pipe connected to a water supply tank, wherein the water supply tank is located above the parabolic trough; and
gravity feeding the water from the water supply tank through the water inlet pipe.

10. The method of claim 8, further comprising:
pumping, by a feed pump connected to the water supply tank, water from the water supply tank through the water inlet pipe into the helical pipe.

11. The method of claim 10, further comprising:
measuring, by a temperature sensor operatively connected to a steam outlet pipe, a temperature of the steam exiting the steam outlet pipe;
generating, by the temperature sensor, temperature data signals when the temperature falls below 100° C.; and
receiving, by the solenoid valve, the temperature data signals; and
opening, by the solenoid valve, the inner pipe.

12. The method of claim 11, further comprising:
pumping, by a bypass pump connected to a bypass pipe, condensed water from the steam holding tank to the water supply tank when the temperature falls below 100° C.

13. The method of claim 12, further comprising:
measuring, by a pressure sensor located on the steam outlet pipe, pressure data signals;
receiving, by a controller including electrical circuitry, a memory including program instructions and at least one processor configured to execute the program instructions, the pressure data signals and the temperature data signals; and
generating, by the controller, control signals for actuating the feed pump and the bypass pump based on the pressure data signals and the temperature data signals.

* * * * *